(12) United States Patent
Zhao et al.

(10) Patent No.: US 10,728,260 B2
(45) Date of Patent: Jul. 28, 2020

(54) SLOW PROTOCOL PACKET PROCESSING METHOD AND RELATED APPARATUS

(71) Applicant: Huawei Technologies Co., Ltd., Shenzhen (CN)

(72) Inventors: Hui Zhao, Nanjing (CN); Feng Qian, Nanjing (CN); Wenhui Li, Nanjing (CN); Zhijian Sun, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/360,917

(22) Filed: Mar. 21, 2019

(65) Prior Publication Data

US 2019/0222584 A1     Jul. 18, 2019

Related U.S. Application Data

(63) Continuation of application No. PCT/CN2017/094163, filed on Jul. 24, 2017.

(30) Foreign Application Priority Data

Dec. 29, 2016   (CN) .......................... 2016 1 1249141

(51) Int. Cl.
*H04L 29/06*     (2006.01)
*H04L 12/721*   (2013.01)
(Continued)

(52) U.S. Cl.
CPC ............ *H04L 63/126* (2013.01); *H04L 29/06* (2013.01); *H04L 45/66* (2013.01); *H04L 47/32* (2013.01);
(Continued)

(58) Field of Classification Search
CPC .............. H04L 63/126; H04L 63/0236; H04L 63/1408; H04L 63/1466; H04L 29/06; H04L 45/66; H04L 47/32; H04L 47/323
See application file for complete search history.

(56) References Cited

U.S. PATENT DOCUMENTS 6,965,941 B2 *  11/2005  Boucher .................. G06F 5/10
                                                                709/230
7,516,211 B1 *  4/2009   Gourlay ............. H04L 41/0816
                                                                370/356
(Continued)

FOREIGN PATENT DOCUMENTS

CN          102082678 A      6/2011
CN          102857521 A      1/2013
(Continued)

OTHER PUBLICATIONS

Machine Translation and Abstract of Chinese Publication No. CN102082678, Jun. 1, 2011, 21 pages.
(Continued)

*Primary Examiner* — Hosuk Song
(74) *Attorney, Agent, or Firm* — Conley Rose, P.C.

(57) ABSTRACT

A Slow Protocol packet processing method and a related apparatus, where the method includes receiving, by a network device, a first Slow Protocol packet, determining, based on port information of a port of the network device receiving the first Slow Protocol packet, that a negotiation process is already completed between the network device and the transmit end device, querying, based on device information of the transmit end device carried in the first Slow Protocol packet, whether a device information base stored by the network device in the negotiation process includes the device information of the transmit end device, and identifying the first Slow Protocol packet as a valid
(Continued)

packet in response to a result that the device information base includes the device information of the transmit end device.

24 Claims, 7 Drawing Sheets

(51) Int. Cl.
*H04L 12/823* (2013.01)
*H04L 12/70* (2013.01)

(52) U.S. Cl.
CPC ...... *H04L 63/0236* (2013.01); *H04L 63/1408* (2013.01); *H04L 63/1466* (2013.01); *H04L 2012/5625* (2013.01)

(56) References Cited

U.S. PATENT DOCUMENTS

| | | | | |
|---|---|---|---|---|
| 7,715,407 | B2* | 5/2010 | Arai | H04L 12/2856 370/395.3 |
| 9,306,907 | B1* | 4/2016 | Lopez | H04L 63/0218 |
| 9,497,132 | B2* | 11/2016 | Saltsidis | H04L 47/34 |
| 9,515,881 | B2* | 12/2016 | Zhang | H04L 12/4675 |
| 2006/0129814 | A1 | 6/2006 | Eun et al. | |
| 2009/0109998 | A1 | 4/2009 | Vinayagam et al. | |
| 2015/0180881 | A1 | 6/2015 | Gu | |

FOREIGN PATENT DOCUMENTS

| | | |
|---|---|---|
| CN | 103297400 A | 9/2013 |
| CN | 103684792 A | 3/2014 |
| CN | 104468246 A | 3/2015 |
| CN | 105791004 A | 7/2016 |

OTHER PUBLICATIONS

Machine Translation and Abstract of Chinese Publication No. CN104468246, Mar. 25, 2015, 14 pages.
Machine Translation and Abstract of Chinese Publication No. CN105791004, Jul. 20, 2016, 11 pages.
"IEEE Standard for Information technology—Telecommunications and information exchange between systems—Local and metropolitan area networks—Specific requirements,Part 3: Carrier sense multiple access with Collision Detection (CSMA/CD) Access Method and Physical Layer Specifications," IEEE Std 802.3™-2008, Dec. 26, 2008, Part 1, 1488 pages.
"IEEE Standard for Information technology—Telecommunications and information exchange between systems—Local and metropolitan area networks—Specific requirements,Part 3: Carrier sense multiple access with Collision Detection (CSMA/CD) Access Method and Physical Layer Specifications," IEEE Std 802.3™-2008, Dec. 26, 2008, Part 2, 1489 pages.
Foreign Communication From a Counterpart Application, PCT Application No. PCT/CN2017/094163, English Translation of International Search Report dated Sep. 27, 2017, 2 pages.
Machine Translation and Abstract of Chinese Publication No. CN103297400, Sep. 11, 2013, 32 pages.
Han, K., et al., "The Design and Implementation of MAC Security in EPON," XP055606398, 8th International Conference Advanced Communication Technology, Jan. 2006, 4 pages.
"IEEE Standard for Local and metropolitan area networks—Port-Based Network Access Control," XP068098968, IEEE Std 802.1X, (Revision of IEEE Std 8021X-2004), Feb. 5, 2010, 222 pages.
Davis, T., "Linux Ethernet Bonding Driver HOWTO," XP002757265, Internet Citation, Apr. 27, 2011, 46 pages.
Anonymous: "Linux/bond_ 3ad.c at master .spotify/linux .GitHub," XP055606488, Jun. 21, 2011, 52 pages.
Katz, D., et al., "Bidirectional Forwarding Detection (BFD)," XP015070820, RFC 5880, Jun. 2010, 50 pages.
Foreign Communication From a Counterpart Application, European Application No. 17886988.9, Extended European Search Report dated Jul. 31, 2019, 12 pages.

* cited by examiner

SLOW PROTOCOL PACKET PROCESSING METHOD AND RELATED APPARATUS

CROSS-REFERENCE TO RELATED APPLICATIONS

This application is a continuation of International Patent Application No. PCT/CN2017/094163 filed on Jul. 24, 2017, which claims priority to Chinese Patent Application No. 201611249141.2 filed on Dec. 29, 2016. The disclosures of the aforementioned applications are hereby incorporated by reference in their entireties.

TECHNICAL FIELD

Embodiments of the present application relate to the field of communications technologies, and in particular, to a Slow Protocol packet processing method and a related apparatus.

BACKGROUND

In the field of communications technologies, a protocol packet of a Slow Protocol has the following characteristics. A destination Media Access Control (MAC) address of the protocol packet uses a Slow_Protocols_Multicast address, and a value of the Slow_Protocols_Multicast address is 01-80-c2-00-00-02, and a value of a type field of the protocol packet is 8809.

Currently, a local device usually establishes a communications link to a peer device in a negotiation process based on the Slow Protocol. To maintain the communications link, the local device and the peer device send the protocol packet to each other in a working process after the negotiation process. After receiving the protocol packet, the local device or the peer device triggers a corresponding operation based on link information indicated in the protocol packet, for example, triggers a fault processing operation based on link fault information.

However, a security threat exists in the working process. When the local device and the peer device are in the working process, an attacker may control either the local device or the peer device to construct a protocol packet, and instruct the device receiving the protocol packet to execute an incorrect action, for example to trigger link fault handling when the communications link is normal. It can be learned that how to resolve the security threat to improve security is a technical problem needing to be resolved currently and urgently.

SUMMARY

A technical problem to be resolved by embodiments of the present application is to provide a Slow Protocol packet processing method and a related apparatus such that a security threat can be resolved when a protocol packet is processed based on a Slow Protocol to improve security.

Therefore, the technical solutions in the embodiments of the present application to the technical problem are as follows.

According to a first aspect, a Slow Protocol packet processing method is provided. The method includes that a network device receives a first Slow Protocol packet from a first port. The first Slow Protocol packet carries device information of a transmit end device of the first Slow Protocol packet. The network device determines, based on port information of the first port, that a negotiation process is already completed between the network device and the transmit end device, and queries, based on the device information of the transmit end device, whether a device information base stored by the network device in the negotiation process includes the device information of the transmit end device. The network device identifies the first Slow Protocol packet as a valid packet if the device information base includes the device information of the transmit end device.

A Slow Protocol packet validation manner is provided based on the solution provided in this embodiment, and a Slow Protocol packet is identified as a valid packet only when the Slow Protocol packet is successfully validated. Therefore, a security threat can be resolved to improve security.

Optionally, the first Slow Protocol packet further carries link information, and the link information is used to indicate a link status of a link between the network device and the transmit end device. The network device identifies the first Slow Protocol packet as the valid packet if the device information base includes the device information of the transmit end device, and the network device triggers a first operation based on the link information. The first operation includes at least one of the following operations, a link reconnection operation or a fault handling operation.

Optionally, the first Slow Protocol packet further carries configuration information of the transmit end device in a working process, and the configuration information of the transmit end device in the working process is different from configuration information of the transmit end device in the negotiation process. The network device identifies the first Slow Protocol packet as the valid packet if the device information base includes the device information of the transmit end device, and the network device triggers a second operation based on the configuration information of the transmit end device in the working process. The second operation includes a link reconnection operation.

Optionally, the network device identifies the first Slow Protocol packet as an invalid packet if the device information base does not include the device information of the transmit end device.

Optionally, the network device identifies the first Slow Protocol packet as an invalid packet if the device information base does not include the device information of the transmit end device, and the network device discards the first Slow Protocol packet.

Based on the foregoing implementations, an invalid remote network device is prevented from communicating with a local network device using a Slow Protocol packet.

Optionally, the method further includes triggering an alarm operation when a quantity of invalid packets received by the network device from the transmit end device in a preset period is greater than or equal to a preset threshold.

The foregoing implementation facilitates resolving a network congestion problem caused by sending a large quantity of invalid Slow Protocol packets by the invalid remote network device.

Optionally, before receiving the first Slow Protocol packet from the first port, the network device receives a second Slow Protocol packet from the first port. The second Slow Protocol packet carries device information of a transmit end device of the second Slow Protocol packet. The second Slow Protocol packet is a negotiation packet. The network device determines that a negotiation process is already completed between the network device and the transmit end device, and stores, in the device information base, the device information of the transmit end device carried in the second Slow Protocol packet.

Optionally, the network device may work in an active mode. The network device obtains a result of matching between configuration information of the network device and configuration information of the transmit end device of the second Slow Protocol packet. Then, the network device determines, based on the matching result, that the configuration information of the network device matches the configuration information of the transmit end device of the second Slow Protocol packet such that the network device determines that the negotiation process is already completed between the network device and the transmit end device.

Optionally, the network device may work in a passive mode. When the network device determines that a negotiation process is already completed between the network device and the transmit end device of the second Slow Protocol packet, the network device receives a third Slow Protocol packet sent by the transmit end device of the second Slow Protocol packet. The third Slow Protocol packet carries configuration information of the network device and configuration information of the transmit end device of the second Slow Protocol packet.

Further, optionally, the second Slow Protocol packet further carries configuration information of the transmit end device of the second Slow Protocol packet. The network device determines an active interface between the network device and the transmit end device of the second Slow Protocol packet based on configuration information of the network device and the configuration information of the transmit end device carried in the second Slow Protocol packet. The network device determines, based on an active interface determined by the transmit end device of the second Slow Protocol packet, that the active interface determined by the network device is consistent with the active interface determined by the transmit end device of the second Slow Protocol packet such that the network device determines that the negotiation process is already completed between the network device and the transmit end device.

According to a second aspect, a network device is provided, where the network device includes a receiving unit and a processing unit. The receiving unit is configured to receive a first Slow Protocol packet from a first port. The first Slow Protocol packet carries device information of a transmit end device of the first Slow Protocol packet. The processing unit is configured to determine, based on port information of the first port, that a negotiation process is already completed between the network device and the transmit end device, query, based on the device information of the transmit end device, whether a device information base stored by the network device in the negotiation process includes the device information of the transmit end device, and identify the first Slow Protocol packet as a valid packet if the device information base includes the device information of the transmit end device.

A Slow Protocol packet validation manner is provided based on the solution provided in this embodiment, and a Slow Protocol packet is identified as a valid packet only when the Slow Protocol packet is successfully validated. Therefore, a security threat can be resolved to improve security.

Optionally, the first Slow Protocol packet further carries link information, and the link information is used to indicate a link status of a link between the network device and the transmit end device. The processing unit is further configured to identify the first Slow Protocol packet as the valid packet if the device information base includes the device information of the transmit end device, and trigger a first operation based on the link information. The first operation includes at least one of the following operations, a link reconnection operation or a fault handling operation.

Optionally, the first Slow Protocol packet further carries configuration information of the transmit end device in a working process, and the configuration information of the transmit end device in the working process is different from configuration information of the transmit end device in the negotiation process. The processing unit is further configured to identify the first Slow Protocol packet as the valid packet if the device information base includes the device information of the transmit end device, and trigger a second operation based on the configuration information of the transmit end device in the working process. The second operation includes a link reconnection operation.

Optionally, the processing unit is further configured to identify the first Slow Protocol packet as an invalid packet if the device information base does not include the device information of the transmit end device.

Optionally, the processing unit is further configured to identify the first Slow Protocol packet as the invalid packet if the device information base does not include the device information of the transmit end device, and discard the first Slow Protocol packet.

Based on the foregoing implementations, an invalid remote network device is prevented from communicating with a local network device using a Slow Protocol packet.

Optionally, the processing unit is further configured to trigger an alarm operation when a quantity of invalid packets received by the receiving unit from the transmit end device in a preset period is greater than or equal to a preset threshold.

The foregoing implementation facilitates resolving a network congestion problem caused by sending a large quantity of invalid Slow Protocol packets by the invalid remote network device.

Optionally, the receiving unit is further configured to receive a second Slow Protocol packet from the first port before receiving the first Slow Protocol packet from the first port. The second Slow Protocol packet carries device information of a transmit end device of the second Slow Protocol packet. The second Slow Protocol packet is a negotiation packet. The processing unit is further configured to determine that a negotiation process is already completed between the network device and the transmit end device, and store, in the device information base, the device information of the transmit end device carried in the second Slow Protocol packet.

Optionally, the network device may work in an active mode. The processing unit is further configured to obtain a result of matching between configuration information of the network device and configuration information of the transmit end device of the second Slow Protocol packet, and determine, based on the matching result, that the configuration information of the network device matches the configuration information of the transmit end device of the second Slow Protocol packet such that the network device determines that the negotiation process is already completed between the network device and the transmit end device.

Optionally, the network device may work in a passive mode. When the processing unit is configured to determine that a negotiation process is already completed between the network device and the transmit end device of the second Slow Protocol packet, the processing unit is further configured to determine that the receiving unit receives a third Slow Protocol packet sent by the transmit end device of the second Slow Protocol packet. The third Slow Protocol packet carries configuration information of the network device and configuration information of the transmit end device of the second Slow Protocol packet.

Further, optionally, the second Slow Protocol packet further carries configuration information of the transmit end device of the second Slow Protocol packet. The processing unit is further configured to determine an active interface between the network device and the transmit end device of the second Slow Protocol packet based on configuration information of the network device and the configuration information of the transmit end device carried in the second Slow Protocol packet, and determine, based on an active interface determined by the transmit end device of the second Slow Protocol packet, that the active interface determined by the network device is consistent with the active interface determined by the transmit end device of the second Slow Protocol packet such that the network device determines that the negotiation process is already completed between the network device and the transmit end device.

According to a third aspect, a network device is provided, including a receiver and a processor. The receiver is connected to the processor. The receiver is configured to receive a first Slow Protocol packet from a first port. The first Slow Protocol packet carries device information of a transmit end device of the first Slow Protocol packet. The processor is configured to determine, based on port information of the first port, that a negotiation process is already completed between the network device and the transmit end device, query, based on the device information of the transmit end device carried in the first Slow Protocol packet, whether a device information base stored by the network device in the negotiation process includes the device information of the transmit end device, and identify the first Slow Protocol packet as a valid packet if the device information base includes the device information of the transmit end device.

A Slow Protocol packet validation manner is provided based on the solution provided in this embodiment, and a Slow Protocol packet is identified as a valid packet only when the Slow Protocol packet is successfully validated. Therefore, a security threat can be resolved to improve security.

Optionally, the first Slow Protocol packet further carries link information, and the link information is used to indicate a link status of a link between the network device and the transmit end device. The processor is further configured to identify the first Slow Protocol packet as the valid packet if the device information base includes the device information of the transmit end device, and trigger a first operation based on the link information. The first operation includes at least one of the following operations, a link reconnection operation or a fault handling operation.

Optionally, the first Slow Protocol packet further carries configuration information of the transmit end device in a working process, and the configuration information of the transmit end device in the working process is different from configuration information of the transmit end device in the negotiation process. The processor is further configured to identify the first Slow Protocol packet as the valid packet if the device information base includes the device information of the transmit end device, and trigger a second operation based on the configuration information of the transmit end device in the working process. The second operation includes a link reconnection operation.

Optionally, the processor is further configured to identify the first Slow Protocol packet as an invalid packet if the device information base does not include the device information of the transmit end device.

Optionally, the processor is further configured to identify the first Slow Protocol packet as the invalid packet if the device information base does not include the device information of the transmit end device, and discard the first Slow Protocol packet.

Based on the foregoing implementations, an invalid remote network device is prevented from communicating with a local network device using a Slow Protocol packet.

Optionally, the processor is further configured to trigger an alarm operation when a quantity of invalid packets received by the receiver from the transmit end device in a preset period is greater than or equal to a preset threshold.

The foregoing implementation facilitates resolving a network congestion problem caused by sending a large quantity of invalid Slow Protocol packets by the invalid remote network device.

Optionally, the receiver is further configured to receive a second Slow Protocol packet from the first port before receiving the first Slow Protocol packet from the first port. The second Slow Protocol packet carries device information of a transmit end device of the second Slow Protocol packet. The second Slow Protocol packet is a negotiation packet. The processor is further configured to determine that a negotiation process is already completed between the network device and the transmit end device, and store, in the device information base, the device information of the transmit end device carried in the second Slow Protocol packet.

Optionally, the network device may work in an active mode. The processor is further configured to obtain a result of matching between configuration information of the network device and configuration information of the transmit end device of the second Slow Protocol packet, and determine, based on the matching result, that the configuration information of the network device matches the configuration information of the transmit end device of the second Slow Protocol packet such that the network device determines that the negotiation process is already completed between the network device and the transmit end device.

Optionally, the network device may work in a passive mode. When the processor is configured to determine that a negotiation process is already completed between the network device and the transmit end device of the second Slow Protocol packet, the processor is further configured to determine that the receiver receives a third Slow Protocol packet sent by the transmit end device of the second Slow Protocol packet. The third Slow Protocol packet carries configuration information of the network device and configuration information of the transmit end device of the second Slow Protocol packet.

Further, optionally, the second Slow Protocol packet further carries configuration information of the transmit end device of the second Slow Protocol packet. The processor is further configured to determine an active interface between the network device and the transmit end device of the second Slow Protocol packet based on configuration information of the network device and the configuration information of the transmit end device carried in the second Slow Protocol packet, and determine, based on an active interface determined by the transmit end device of the second Slow Protocol packet, that the active interface determined by the network device is consistent with the active interface determined by the transmit end device of the second Slow Protocol packet such that the network device determines that the negotiation process is already completed between the network device and the transmit end device.

According to the first aspect, the second aspect, and the third aspect, optionally, the network device is connected to the transmit end device of the first Slow Protocol packet directly or using a transparent transmission device.

According to the first aspect, the second aspect, and the third aspect, optionally, a value of a destination MAC address of the first Slow Protocol packet is 01-80-c2-00-00-02, and a value of a type field of the first Slow Protocol packet is 8809.

According to the first aspect, the second aspect, and the third aspect, optionally, the first Slow Protocol packet is an operation, administration and maintenance (OAM) protocol packet, and the device information of the transmit end device of the first Slow Protocol packet includes one or more pieces of information indicated by a source address field or information indicated by an organizationally unique identifier (OUI) field of the first Slow Protocol packet, or the first Slow Protocol packet is a marker protocol packet or a Link Aggregation Control Protocol (LACP) packet, and the device information of the transmit end device of the first Slow Protocol packet includes one or more pieces of information indicated by a source address field or information indicated by an actor_system field of the first Slow Protocol packet.

According to a fourth aspect, a computer storage medium is provided, where the computer storage medium is configured to store a program, code, or an instruction used by the network device. When executing the program, the code, or the instruction, a processor or a hardware device may complete the functions or the steps of a provider edge (PE) network device in the foregoing aspects.

As can be known based on the foregoing technical solutions, in the embodiments of the present application, the network device receives the first Slow Protocol packet, and the first Slow Protocol packet carries the device information of the transmit end device of the first Slow Protocol packet. The network device determines that the negotiation process is already completed between the network device and the transmit end device, queries whether the device information base stored by the network device in the negotiation process includes the device information of the transmit end device, and identifies the first Slow Protocol packet as the valid packet if the device information base stored by the network device in the negotiation process includes the device information of the transmit end device. It can be learned that the embodiments of the present application provide a Slow Protocol packet validation manner, and a Slow Protocol packet is identified as a valid packet only when the Slow Protocol packet is successfully validated to perform a corresponding operation. Therefore, a security threat can be resolved to improve security.

BRIEF DESCRIPTION OF DRAWINGS

To describe the technical solutions in some of the embodiments of the present application more clearly, the following briefly describes the accompanying drawings describing the embodiments. The accompanying drawings in the following description show merely some embodiments of the present application, and persons of ordinary skill in the art may still derive other drawings from these accompanying drawings without creative efforts.

DESCRIPTION OF EMBODIMENTS

Figure 1:
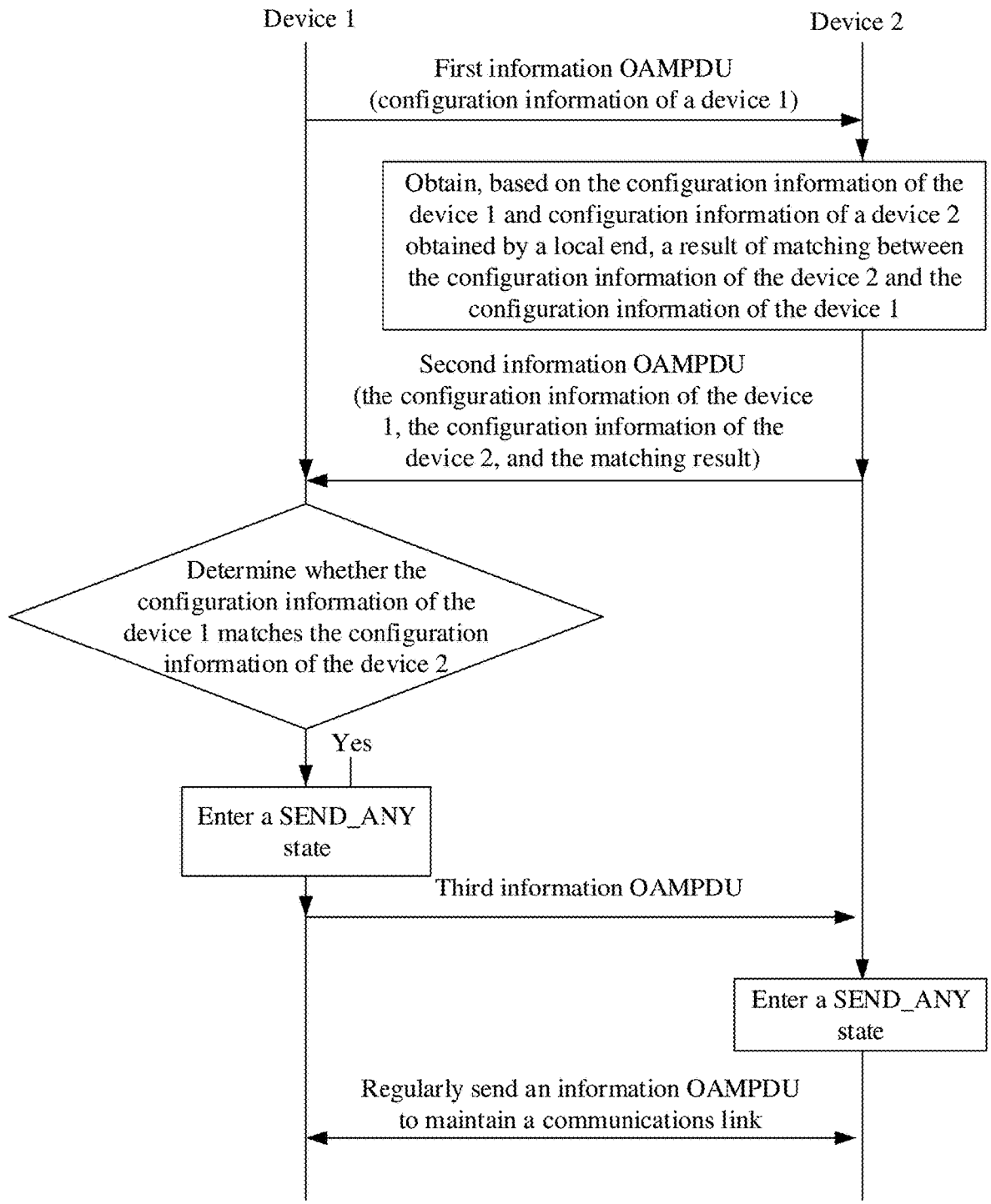
FIG. 1 shows a communication method of an OAM protocol.

A Slow Protocol is first described in an embodiment of the present application. Based on research into a Slow Protocol defined by the Institute of Electrical and Electronics Engineers (IEEE) 802.3, features of a Slow Protocol packet and transmission characteristics of the Slow Protocol are defined in the IEEE 802.3 Annex. The features of the Slow Protocol packet include that a destination MAC address of the Slow Protocol packet uses a Slow_Protocols_Multicast address, and a value of the Slow_Protocols_Multicast address is 01-80-c2-00-00-02, and a value of a type field of the Slow Protocol packet is 8809. The value of the type field of the protocol packet is used to indicate that the protocol packet is a Slow Protocol packet. Therefore, a link layer protocol corresponding to a link layer protocol packet including the features of the Slow Protocol packet belongs to the Slow Protocol. The transmission characteristics of the Slow Protocol include a quantity of frames of each Slow Protocol subtype that are transmitted within any one-second period does not exceed 10, a maximum quantity of Slow Protocol subtypes is 10, MAC client data generated by the Slow Protocol should not be greater than a maximum basic data size. Optionally, a maximum length of a frame of the Slow Protocol does not exceed 128 octets.

A currently used type of the Slow Protocol includes the LACP, a marker protocol, and an OAM protocol. The marker protocol is a derivative protocol of the LACP.

Formats of protocol packets of the OAM protocol and the LACP and communication processes are separately described below. The marker protocol is similar to the LACP.

The OAM protocol is first described. A common format of the OAM protocol packet is A destination MAC address uses a Slow_Protocols_Multicast address, a value of the Slow_Protocols_Multicast address is 01-80-c2-00-00-02, a value of a type field of a protocol packet is 8809, and a value of a subtype field of the protocol packet is 03. The value of the subtype field is used to indicate that the protocol packet is the OAM protocol packet. A type of the OAM protocol packet includes an information OAM protocol data unit (PDU), an event notification OAMPDU, a loopback control OAMPDU, and the like.

A value of a code field of the information OAMPDU is 0, and is used to discover a peer end, maintain connectivity, and notify a fault. The information OAMPDU includes a source address field, an OUI field, a flags field, a local information type length value (TLV) field, a remote information TLV field, and the like. The source address field is used to indicate a source address of the information OAMPDU, that is, an address of a sending port of the information OAMPDU. Information indicated by the OUI field is unique for each device manufactured by a device manufacturer. The flags field is used to indicate whether a link fault occurs. The local information TLV field is used to indicate configuration information of a local device. The remote information TLV field is used to indicate configuration information of a peer device. When the flags field in the information OAMPDU indicates occurrence of the link fault, and the local Information TLV field indicates a type of the link fault, a device receiving the information OAMPDU triggers a link fault handling operation and the like.

A communication process of the information OAMPDU is shown in FIG. 1, a device 1 works in an active mode, and a device 2 works in a passive mode. The device 1 first sends a first information OAMPDU to the device 2, the first information OAMPDU carries configuration information of the device 1 and the like, and the configuration information is used to indicate a function of the device 1. After receiving the first information OAMPDU, the device 2 obtains the configuration information of the device 1 from the first information OAMPDU, and obtains, based on the configuration information of the device 1 and configuration information of the device 2 obtained by a local end of the device 2, a result of matching between the configuration information of the device 2 and the configuration information of the device 1, that is, whether the device 2 supports the function of the device 1. For example, if the matching result is 1, it indicates that the device 2 supports the function of the device 1, or if the matching result is 0, it indicates that the device 2 does not support the function of the device 1. Whether the device 2 supports the function of the device 1 means whether the device 2 supports one or more specific functions of the device 1. Specific functions needing to be supported may be configured based on different scenarios and requirements. The device 2 sends a second information OAMPDU to the device 1, and the second information OAMPDU carries the configuration information of the device 1, the configuration information of the device 2, and the matching result. After receiving the second information OAMPDU, the device 1 determines whether the configuration information of the device 1 matches the configuration information of the device 2. The device 1 may first determine, based on the matching result in the second information OAMPDU, whether the device 2 supports the function of the device 1. If the matching result in the second information OAMPDU is that the device 2 supports the function of the device 1, the device 1 may directly enter a working process. The device 1 enters a SEND_ANY state for the OAM protocol. If the matching result in the second information OAMPDU is that the device 2 does not support the function of the device 1, the device 1 may determine, based on the configuration information of the device 2 carried in the second information OAMPDU and the configuration information of the device 1 obtained from a local end of the device 1, whether the device 1 supports a function of the device 2. If the device 1 supports the function of the device 2, the device 1 may enter a SEND_ANY state. After the device 1 enters the SEND_ANY state, the device 1 sends a third information OAMPDU to the device 2, and the third information OAMPDU carries the configuration information of the device 1 and the configuration information of the device 2. The device 2 enters the SEND_ANY state. Then, the information OAMPDU is mutually sent between the device 1 and the device 2 regularly, to maintain a communications link between the device 1 and the device 2. The information OAMPDU may carry link fault information, and the device receiving the information OAMPDU triggers a fault handling operation based on the link fault information, for example, sending alarm information to a network management system.

However, a security threat exists when the device 1 and the device 2 are in the SEND_ANY state. When the device 1 and the device 2 are in the SEND_ANY state, in an attack manner, an attacker may control a device 3 connected to the device 2 to construct an information OAMPDU, and send the information OAMPDU to the device 1 using the device 2. In another attack manner, an attacker directly controls the device 2 to construct an information OAMPDU and sends the information OAMPDU to the device 1. In the two attack manners, each field of the constructed information OAMPDU is filled with false information, and the constructed information OAMPDU further carries link fault information. In other approaches, after receiving the constructed information OAMPDU, the device 1 does not validate information in the information OAMPDU, but determines that each field of the information OAMPDU is filled with the information. Even if the information is false, the device 1 also identifies the received information OAMPDU as a valid protocol packet. Therefore, the device 1 directly triggers the fault handling operation based on the link fault information. Therefore, the attacker enables the device 1 to trigger link fault handling when the communications link is normal. Consequently, link flapping is caused.

The LACP is described below. A common format of the LACP packet is that a destination MAC address uses a Slow_Protocols_Multicast address, a value of the Slow_Protocols_Multicast address is 01-80-c2-00-00-02, a value of a type field of a protocol packet is 8809, and a value of a subtype field of the protocol packet is 01. The value of the subtype field is used to indicate that the protocol packet is the LACP packet.

A type of the LACP packet includes an LACP PDU. The LACP PDU includes a source address field, an actor field, a partner field, and the like. A subfield of the actor field is an actor_system field. The source address field is used to indicate a source address of the LACP PDU, that is, an address of a sending port of the LACP PDU. The actor field is used to indicate device information of a local end, that is, device information of a sending device of the LACP PDU. The partner field is used to indicate device information of a peer end, that is, device information of a receiving device of the LACP PDU. The actor_system field is used to indicate a device identifier of the local end, that is, a device identifier of the sending device of the LACP PDU.

Figure 2:
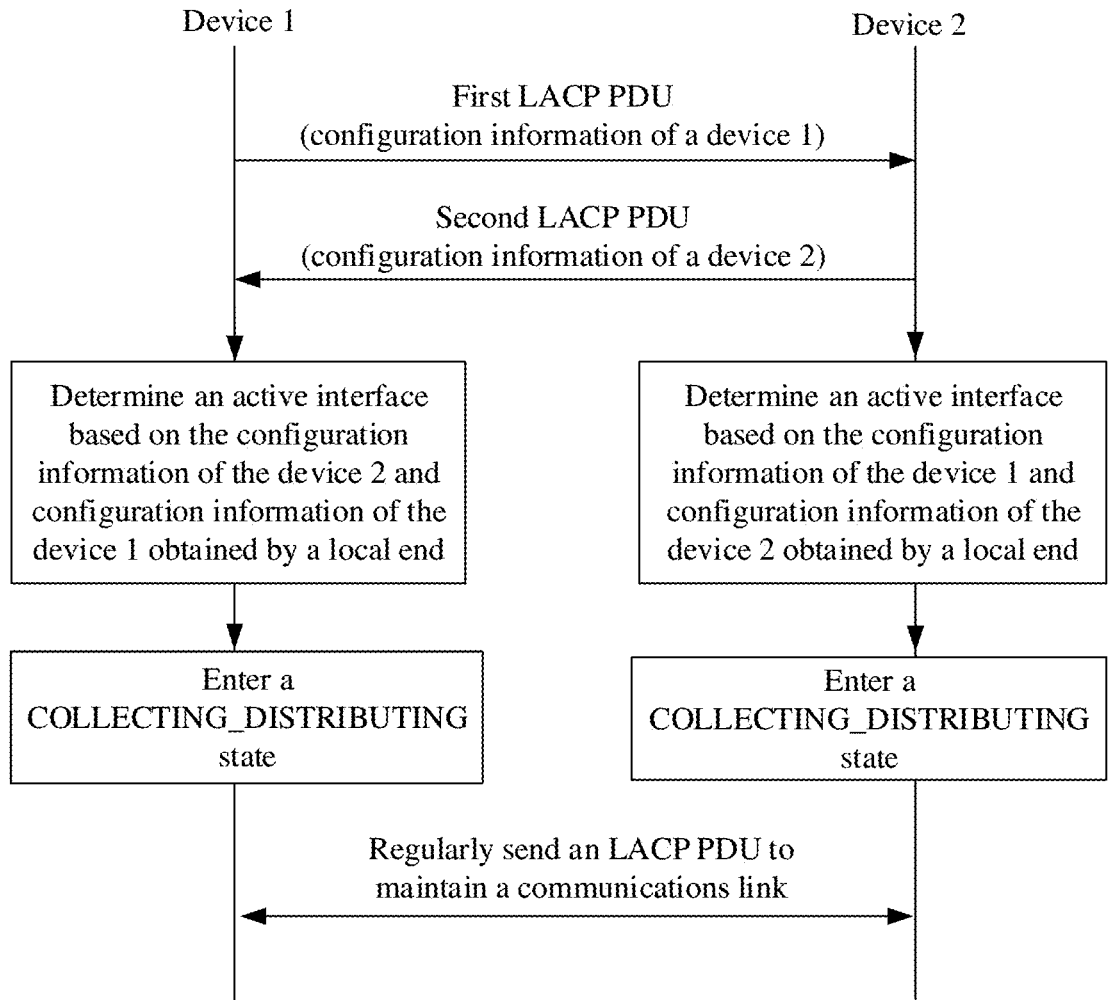
FIG. 2 shows a communication method of the LACP or a marker protocol.

A communication process of the LACP PDU is shown in FIG. 2. The LACP PDU is mutually sent between the devices at two ends. A device 1 sends a first LACP PDU to a device 2, and the first LACP PDU carries configuration information of the device 1. After receiving the first LACP PDU, the device 2 determines an active end in the device 1 and the device 2 based on the configuration information of the device 1 carried in the first LACP PDU and configuration information of the device 2 obtained by a local end of the device 2, and then determines an active interface between the device 1 and the device 2 in an interface of the active end. When determining the active end, the device 2 determines a device priority of the device 1 in the configuration information of the device 1, determines a device priority of the device 2 in the configuration information of the device 2, compares the device priority of the device 1 and the device priority of the device 2, and uses a device having a higher device priority value as the active end. After the active end is determined, an interface priority of the active end is determined in the configuration information of the device 1 or the configuration information of the device 2, and the active interface is determined using the interface priority of the active end.

The device 2 sends a second LACP PDU to the device 1, and the second LACP PDU carries the configuration information of the device 2. After receiving the second LACP PDU, the device 1 determines an active end in the device 1 and the device 2 based on the configuration information of the device 2 carried in the second LACP PDU and configuration information of the device 1 obtained by a local end of the device 1, and then determines an active interface between the device 1 and the device 2 in an interface of the active end. The actor field indicates configuration information of the local end, that is, configuration information of the sending device of the LACP PDU. The partner field is used to indicate configuration information of the peer end, that is, configuration information of the receiving device of the LACP PDU. Configuration information may include device-related configuration information, such as a device priority or a port priority. The configuration information may further include link information related to a link status and the like, such as a simplex/duplex status of a link or bandwidth information of a link. After the device 1 and the device 2 determine the active interfaces, if the active interface determined by the device 1 is consistent with the active interface determined by the device 2, an LACP negotiation is completed. The device 1 and the device 2 then respectively enter a working process to forward data, and enter a COLLECTING_DISTRIBUTING state for the LACP. When the configuration information of either device changes, for example, when the device priority of the device 1 changes, a link reconnection is performed between the device 1 and the device 2, that is, a negotiation is performed again, to determine a new active interface.

However, a security threat exists when the device 1 and the device 2 are in the COLLECTING_DISTRIBUTING state When the device 1 and the device 2 are in the COLLECTING_DISTRIBUTING state, in an attack manner, an attacker may control a device 3 connected to the device 2 to construct an LACP PDU, and send the LACP PDU to the device 1 using the device 2. In another attack manner, an attacker directly controls the device 2 to construct an LACP PDU and sends the LACP PDU to the device 1. In the two attack manners, each field of the constructed LACP PDU is filled with false information. In the other approaches, after receiving the constructed LACP PDU, the device 1 does not validate information in the LACP PDU, but determines that each field of the LACP PDU is filled with the information. Even if the information is false, the device 1 also identifies the received LACP PDU as a valid protocol packet. Moreover, configuration information carried in the constructed LACP PDU is different from configuration information in a negotiation process. Therefore, the device 1 directly triggers a link reconnection based on the configuration information carried in the constructed LACP PDU. Therefore, the attacker enables the device 1 and the device 2 to trigger the link reconnection when the communications link is normal. Consequently, link flapping is caused. Because the marker protocol is a derivative protocol of the LACP, a communication process of a protocol packet of the marker protocol is similar to the communication process of the protocol packet of the LACP. Details are not described herein again. It can be learned that how to resolve the security threat to improve security is a technical problem needing to be resolved currently and urgently.

Figure 3:
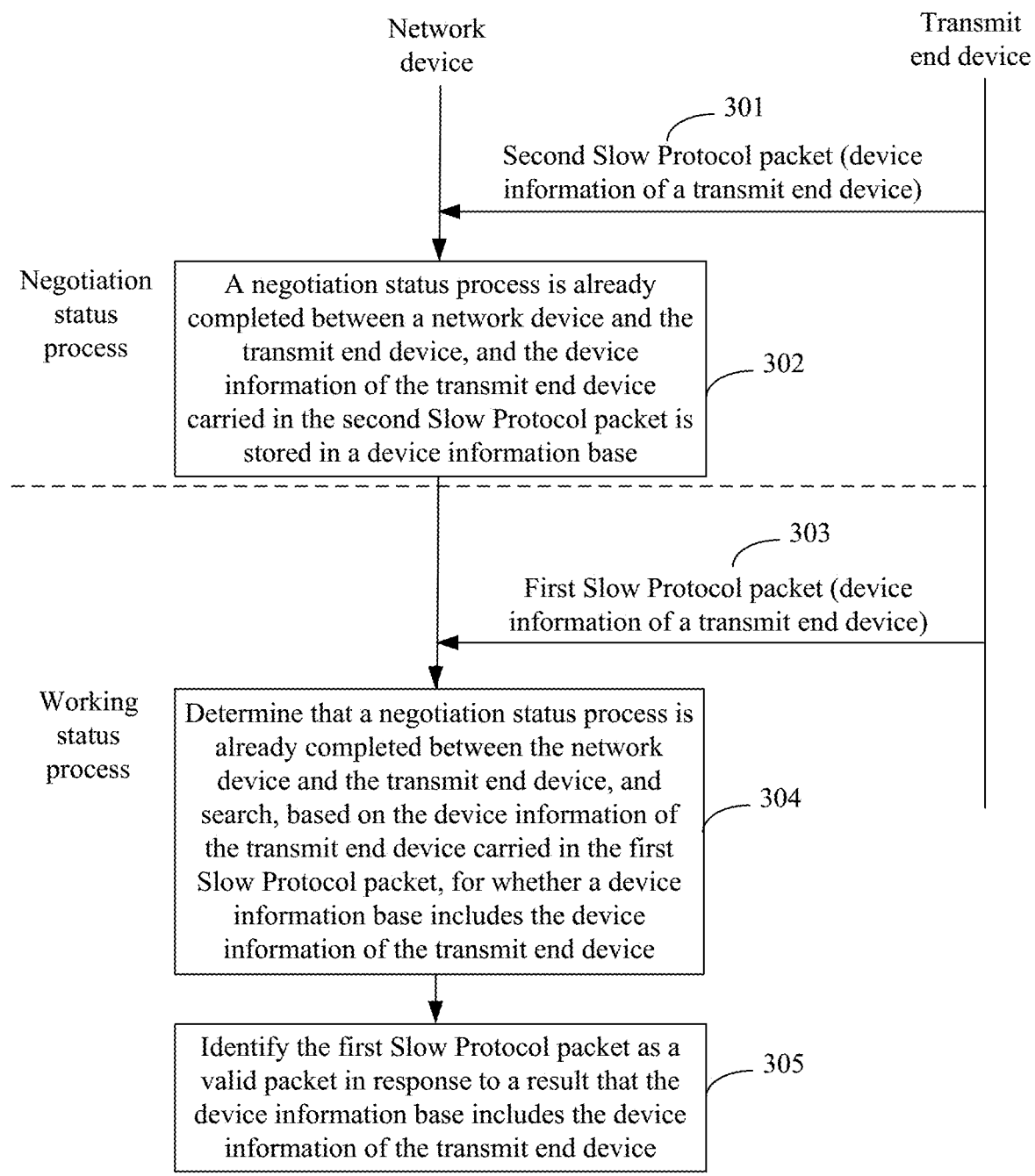
FIG. 3 is a schematic flowchart of a method embodiment according to an embodiment of the present application.

Referring to FIG. 3, an embodiment of the present application provides a method embodiment of a Slow Protocol packet processing method.

In this embodiment, a destination MAC address of a Slow Protocol packet uses a Slow_Protocols_Multicast address, a value of the Slow_Protocols_Multicast address is 01-80-c2-00-00-02, and a value of a type field of the Slow Protocol packet is 8809. A Slow Protocol may be the LACP, a marker protocol, or an OAM protocol. When the Slow Protocol is the OAM protocol, the Slow Protocol packet is an information OAMPDU. When the Slow Protocol is the LACP, the Slow Protocol packet is an LACP PDU. When the Slow Protocol is the marker protocol, the Slow Protocol packet is a marker PDU.

In this embodiment, a network device stores a device information base, and the device information base includes device information stored by the network device in a negotiation process (which is also referred to as a discovery process).

The method in this embodiment includes the following steps.

Step 303: The network device receives a first Slow Protocol packet.

The first Slow Protocol packet carries device information of a transmit end device of the first Slow Protocol packet. The device information of the transmit end device of the first Slow Protocol packet may be device identification information of the transmit end device of the first Slow Protocol packet, and is used to uniquely identify the transmit end device of the first Slow Protocol packet. When the first Slow Protocol packet is an information OAMPDU, the device information of the transmit end device of the first Slow Protocol packet may include one or more pieces of information indicated by a source address field or information indicated by an OUI field of the first Slow Protocol packet. When the first Slow Protocol packet is a marker PDU or an LACP PDU, the device information of the transmit end device of the first Slow Protocol packet may include one or more pieces of information indicated by a source address field or information indicated by an actor_system field of the first Slow Protocol packet.

In this embodiment, the network device may be connected to the transmit end device of the first Slow Protocol packet directly using a communications link or using a transparent transmission device.

Step 304: The network device determines, based on port information of a port of the network device receiving the first Slow Protocol packet, that a negotiation process is already completed between the network device and the transmit end device, and queries, based on the device information of the transmit end device carried in the first Slow Protocol packet, whether a device information base stored by the network device in the negotiation process includes the device information of the transmit end device.

After receiving the first Slow Protocol packet, the network device can determine a port receiving the first Slow Protocol packet, and the network device stores port information corresponding to the port. The port information can indicate whether a negotiation process is already completed between the network device and a device that is connected to the port.

For example, a network device 1 is connected to a network device 2 using a port 1 of the network device 1, and initial information is stored in port information of the port 1. For example, the port information of the port 1 is marked as 00, indicating that a negotiation process is not completed between the network device 1 and the network device 2. The network device 1 communicates with the network device 2 in the negotiation process using the port 1, and determines that the negotiation process is completed between the network device 1 and the network device 2. Therefore, information indicating that the negotiation process is already completed is stored in the port information of the port 1. For example, the port information of the port 1 is marked as 01, indicating that the negotiation process is already completed between the network device 1 and the network device 2. After receiving the first Slow Protocol packet using the port 1, the network device 1 can determine, based on the stored port information of the port 1, whether the negotiation process is already completed between the network device 1 and the network device 2. For example, if the network device 1 finds that the port information of the port 1 is 00, it indicates that the negotiation process is not completed between the network device 1 and the network device 2. If the network device 1 finds that the port information of the port 1 is 01, it indicates that the negotiation process is already completed between the network device 1 and the network device 2.

After determining that the negotiation process is already completed between the network device and the transmit end device, the network device queries whether the device information base includes the device information of the transmit end device. The device information base includes device information received by the network device in the negotiation process. Further, in this embodiment of the present application, the network device receives a second Slow Protocol packet in the negotiation process, and stores, in the device information base, device information of a transmit end device of the second Slow Protocol packet carried in the second Slow Protocol packet.

After the negotiation process is completed between the network device and the transmit end device, the network device and the transmit end device separately enter a working process. The working process is a steady-state process entered after the negotiation process. When the first Slow Protocol packet is the information OAMPDU, the working process may be a process of being in a SEND_ANY state. When the first Slow Protocol packet is the marker PDU or the LACP PDU, the working process may be a process of being in a COLLECTING_DISTRIBUTING state.

Step 305: The network device identifies the first Slow Protocol packet as a valid packet in response to a result that the device information base includes the device information of the transmit end device.

If the device information base includes the device information of the transmit end device, it indicates that the device information of the transmit end device carried in the first Slow Protocol packet is consistent with the device information of the transmit end device stored in the device information base in the negotiation process. Therefore, it indicates that the first Slow Protocol packet is not a protocol packet constructed during an attack, and the first Slow Protocol packet is identified as the valid packet.

After the first Slow Protocol packet is identified as the valid packet, a corresponding operation may be further triggered based on the first Slow Protocol packet, and is separately described below.

In an optional implementation, the first Slow Protocol packet further carries link information, and the link information is used to indicate a link status of a link between the network device and the transmit end device. After the network device identifies the first Slow Protocol packet as the valid packet in response to a result that the device information base includes the device information of the transmit end device, the method further includes triggering, by the network device, a first operation based on the link information. The first operation includes at least one of the following operations, a link reconnection operation or a fault handling operation. The link information may be link fault information. For example, the first Slow Protocol packet is the information OAMPDU, the information OAMPDU carries the link fault information, and the network device triggers the fault handling operation based on the link fault information. Alternatively, the link information may be a link status in the working process. For example, the first Slow Protocol packet is the LACP PDU, and the LACP PDU carries a link status of a link between the network device and the transmit end device of the LACP PDU in the working process, such as a simplex/duplex status or bandwidth information. The link status of the link in the working process is different from a link status of the link in the negotiation process through comparison. The network device triggers the link reconnection operation based on the link status of the link in the working process.

In another optional implementation, the first Slow Protocol packet further carries configuration information of the transmit end device in the working process, and the configuration information of the transmit end device in the working process is different from configuration information of the transmit end device in the negotiation process. After the network device identifies the first Slow Protocol packet as the valid packet in response to a result that the device information base includes the device information of the transmit end device, the method further includes triggering, by the network device, a second operation based on the configuration information of the transmit end device in the working process. The second operation includes a link reconnection operation. For example, the first Slow Protocol packet is the information OAMPDU or the LACP PDU, and the first Slow Protocol packet carries the configuration information of the transmit end device of the first Slow Protocol packet in the working process. The configuration information of the transmit end device in the working process is different from the configuration information of the transmit end device in the negotiation process through comparison. The network device triggers the link reconnection operation based on the configuration information of the transmit end device in the working process.

If the device information base does not include the device information of the transmit end device, it indicates that the device information of the transmit end device carried in the first Slow Protocol packet is inconsistent with the device information of the transmit end device stored in the device information base in the negotiation process. Therefore, it indicates that the first Slow Protocol packet is a protocol packet constructed during an attack, and the first Slow Protocol packet is identified as an invalid packet.

When the first Slow Protocol packet is identified as the invalid packet, the first Slow Protocol packet may be further discarded such that an operation triggered for the first Slow Protocol packet is not performed. Further, after the network device identifies the first Slow Protocol packet as the invalid packet in response to a result that the device information base does not include the device information of the transmit end device, the method further includes discarding, by the network device, the first Slow Protocol packet. For example, the first Slow Protocol packet is the information OAMPDU. Even if the information OAMPDU carries the link fault information, the network device discards the information OAMPDU, to avoid triggering fault handling based on the link fault information. After the first Slow Protocol packet is identified as the invalid packet, prompt information may be further generated, an alarm may be given, or the like. In this embodiment of the present application, an alarm operation may be triggered when a quantity of invalid packets received by the network device from the transmit end device in a preset period is greater than or equal to a preset threshold, for example, reporting alarm information to a network management device.

As can be known based on the foregoing technical solution, in this embodiment of the present application, the network device receives the first Slow Protocol packet, and the first Slow Protocol packet carries the device information of the transmit end device of the first Slow Protocol packet. The network device determines that the negotiation process is already completed between the network device and the transmit end device, queries whether the device information base stored by the network device in the negotiation process includes the device information of the transmit end device, and if the device information base stored by the network device in the negotiation process includes the device information of the transmit end device, identifies the first Slow Protocol packet as the valid packet, or if the device information base stored by the network device in the negotiation process does not include the device information of the transmit end device, identifies the first Slow Protocol packet as the invalid packet. It can be learned that this embodiment of the present application provides a Slow Protocol packet validation manner, and a Slow Protocol packet is identified as a valid packet only when the Slow Protocol packet is successfully validated, to perform a corresponding operation. Therefore, a security threat can be resolved to improve security.

In this embodiment of the present application, the network device stores the device information in the device information base. A storage process is described below.

The method in this embodiment may further include the following steps.

Step 301: The network device receives a second Slow Protocol packet.

The second Slow Protocol packet carries device information of a transmit end device of the second Slow Protocol packet. The second Slow Protocol packet is a negotiation packet. That is, the second Slow Protocol packet is a protocol packet received by the network device in a negotiation process. Further, the network device may determine, based on port information of a port of the network device receiving the second Slow Protocol packet, that the negotiation process is not completed between the network device and the transmit end device of the second Slow Protocol packet, to determine that the second Slow Protocol packet is the negotiation packet.

The device information of the transmit end device of the second Slow Protocol packet may be device identification information of the transmit end device of the second Slow Protocol packet, and is used to uniquely identify the transmit end device of the second Slow Protocol packet. When the second Slow Protocol packet is an information OAMPDU, the device information of the transmit end device of the second Slow Protocol packet may include information indicated by a source address field and/or information indicated by an OUI field of the second Slow Protocol packet. When the second Slow Protocol packet is a marker PDU or an LACP PDU, the device information of the transmit end device of the second Slow Protocol packet may include information indicated by a source address field and/or information indicated by an actor_system field of the second Slow Protocol packet. The transmit end device of the second Slow Protocol packet may be the same as or different from the transmit end device of the first Slow Protocol packet.

Step 302: The network device determines that the negotiation process is already completed between the network device and the transmit end device of the second Slow Protocol packet, and stores, in the device information base, the device information of the transmit end device carried in the second Slow Protocol packet.

It can be learned that when a negotiation succeeds, the network device stores the device information of the transmit end device carried in the second Slow Protocol packet. Therefore, a received Slow Protocol packet can be validated in a working process to improve security.

It should be noted that a Slow Protocol packet received by a same port is usually sent from a same transmit end device. Therefore, when storing the device information in the device information base, the network device may correspondingly store the device information and a port identifier of the port receiving the Slow Protocol packet, that is, establish a mapping relationship between the device information and the port identifier. In step 304, the network device may query the device information base for whether device information corresponding to a port identifier of the port of the network device receiving the first Slow Protocol packet is consistent with the device information of the transmit end device carried in the first Slow Protocol packet. An example is used below for description.

The network device receives a second Slow Protocol packet from a port 1 of the network device, and the device information of the transmit end device of the second Slow Protocol packet carried in the second Slow Protocol packet is device information 01. Therefore, the network device correspondingly stores the port 1 and the device information 01 in the device information base. The network device receives the first Slow Protocol packet from the port 1 of the network device. The device information of the transmit end device of the first Slow Protocol packet carried in the first Slow Protocol packet is device information 02. The network device first finds, in the device information base based on the port identifier of the port receiving the first Slow Protocol packet, namely, the port 1, that the device information corresponding to the port 1 is the device information 01, and then determines whether the device information 02 carried in the first Slow Protocol packet is consistent with the found device information 01. If consistent, it indicates that the first Slow Protocol packet is the valid packet. The network device receives the first Slow Protocol packet and the second Slow Protocol packet from the same port, namely, the port 1. Therefore, the transmit end device of the first Slow Protocol packet is the same as the transmit end device of the second Slow Protocol packet. In addition, the network device may further correspondingly store the port 1, a protocol type of the second Slow Protocol packet, and the device information 01. Therefore, when querying the device information base, the network device may query corresponding device information based on the port 1 and a protocol type of the first Slow Protocol packet.

In step 302, a plurality of manners may be used by the network device to determine that the negotiation process is already completed between the network device and the transmit end device of the second Slow Protocol packet, and are described below in detail.

In a scenario in which an active mode is distinguished from a passive mode, for example, the Slow Protocol is the OAM protocol, and the network device works in the active mode. The network device obtains a result of matching between configuration information of the network device and configuration information of the transmit end device of the second Slow Protocol packet. The network device determines, based on the matching result, that the configuration information of the network device matches the configuration information of the transmit end device of the second Slow Protocol packet, to determine that the negotiation process is already completed. The second Slow Protocol packet may further carry the matching result, and the network device obtains the matching result from the second Slow Protocol packet. Alternatively, the second Slow Protocol packet further carries the configuration information of the transmit end device of the second Slow Protocol packet, and the network device obtains the matching result based on the configuration information of the network device and the configuration information carried in the second slow protocol packet. The configuration information can indicate a function of the device, for example, can indicate whether the device supports a link parsing event, whether the device is capable of sending an OAMPDU when a receiving link does not work, and octets of a maximum supported OAMPDU, and the like.

In a scenario in which an active mode is distinguished from a passive mode, for example, the Slow Protocol is the OAM protocol, and the network device works in the passive mode. The network device receives a third Slow Protocol packet sent by the transmit end device of the second Slow Protocol packet, and the third Slow Protocol packet carries configuration information of the network device and configuration information of the transmit end device of the second Slow Protocol packet. Therefore, the network device determines that the negotiation process is already completed.

In a scenario in which an active mode is not distinguished from a passive mode, for example, the Slow Protocol is the marker protocol or the LACP. The second Slow Protocol packet further carries configuration information of the transmit end device of the second Slow Protocol packet. The network device determines an active interface between the network device and the transmit end device of the second Slow Protocol packet based on configuration information of the network device and the configuration information of the transmit end device carried in the second Slow Protocol packet. The network device determines, based on an active interface determined by the transmit end device of the second Slow Protocol packet, whether the active interface determined by the network device is consistent with the active interface determined by the transmit end device of the second Slow Protocol packet. If the active interface determined by the network device is consistent with the active interface determined by the transmit end device of the second Slow Protocol packet, the network device determines that the negotiation process is already completed.

This embodiment of the present application is separately described below in detail using an example in which the link layer protocol is the OAM protocol and the LACP.

Figure 4A:
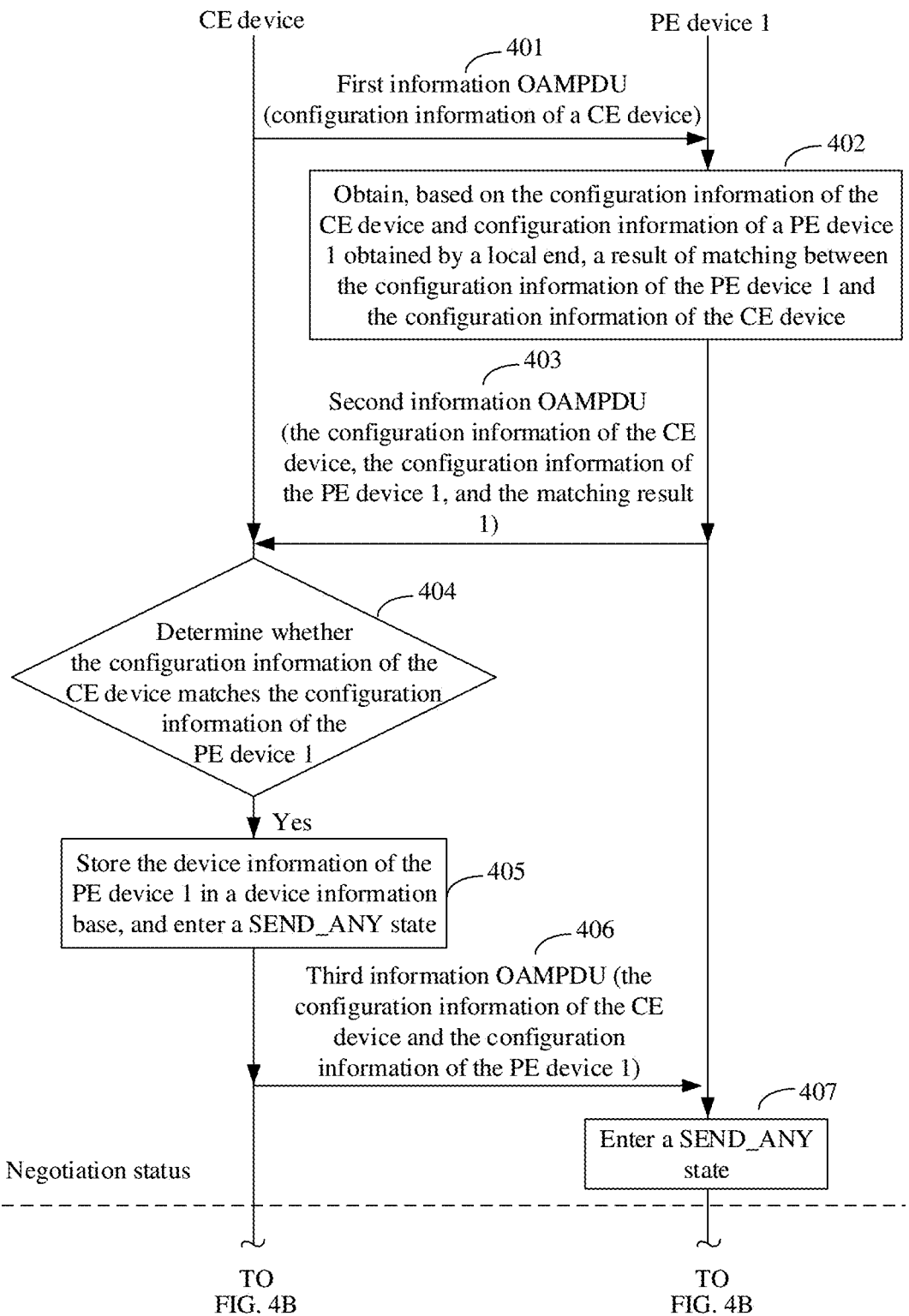
FIG. 4A and FIG. 4B are a schematic flowchart of another method embodiment according to an embodiment of the present application.
Figure 4B:
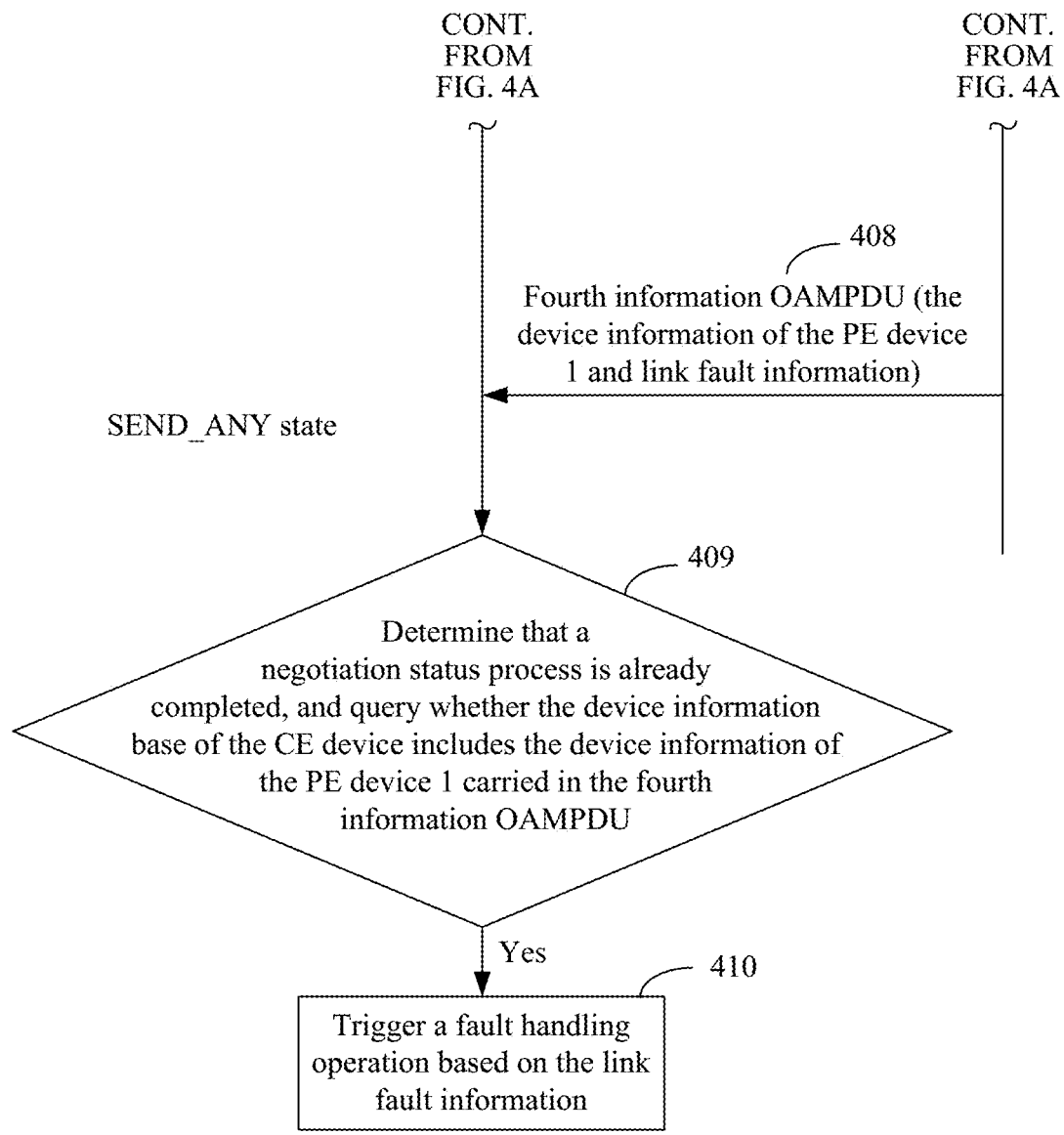

Referring to FIG. 4A and FIG. 4B, an embodiment of the present application provides another method embodiment of a Slow Protocol packet processing method. A Slow Protocol in this embodiment is an OAM protocol, and a Slow Protocol packet is an information OAMPDU.

Figure 5:
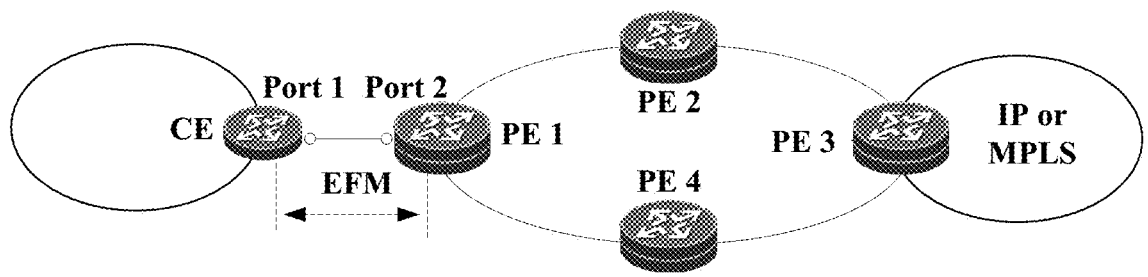
FIG. 5 is a schematic structural diagram of an application scenario of the embodiment shown in FIG. 4A and FIG. 4B.

FIG. 5 is a typical application scenario of this embodiment. The application scenario includes a customer edge (CE) device and a PE device. The CE device represents a service access device, and may be user equipment. The PE device is a service providing device, and may be an operator device.

The application scenario is shown in FIG. 5, and include the CE device, a PE device 1 (designated as PE 1), a PE device 2 (designated as PE 2), a PE device 3 (designated as PE 3), and a PE device 4 (designated as PE 4). A port 1 of the CE device is connected to a port 2 of the PE device 1, and the CE device and the PE device 1 construct an Ethernet in the First Mile (EFM) connection. The EFM is also referred to as the IEEE 802.3ah protocol, and belongs to an 802 protocol suite. The PE 1 is separately connected to the PE 2 and the PE 4, the PE 2 and the PE 4 are separately connected to the PE 3, and the PE 3 is located in an Internet Protocol (IP) network or a multiprotocol label switching (MPLS) network.

The method in this embodiment includes the following steps.

Step 401: The CE device sends a first information OAMPDU to the PE device 1, where the first information OAMPDU carries configuration information of the CE device, and the configuration information of the CE device can indicate a function of the CE device, for example, can indicate whether the CE device supports a link parsing event, whether the CE device is capable of sending an OAMPDU when a receiving link does not work, and octets of a maximum supported OAMPDU, and the like.

Step 402: After receiving the first information OAMPDU, the PE device 1 obtains the configuration information of the CE device from the first information OAMPDU, and obtains, based on the configuration information of the CE device and configuration information of the PE device 1 obtained by a local end, a result of matching between the configuration information of the PE device 1 and the configuration information of the CE device.

The matching result is used to indicate whether the PE device 1 supports the function of the CE device. For example, if the matching result is 1, it indicates that the PE device 1 supports the function of the CE device, or if the matching result is 0, it indicates that the PE device 1 does not support the function of the CE device.

Step 403: The PE device 1 sends a second information OAMPDU to the CE device, where the second information OAMPDU carries the configuration information of the CE device, the configuration information of the PE device 1, and the matching result.

In this embodiment of the present application, the second information OAMPDU further carries device information of the PE device 1. Because a source address field and an OUI field that are in an information OAMPDU can be combined as a unique identifier of a device, information indicated by a source address field and an OUI field that are in the second information OAMPDU may be used as the device information of the PE device 1. It should be noted that no new information is added to the information OAMPDU in this embodiment of the present application, but information originally existing in the information OAMPDU is used. For example, the PE device 1 is identified using the information indicated by the source address field and information indicated by the OUI field. It is additionally noted that the information indicated by the source address field in the information OAMPDU is used during forwarding.

Step 404: After receiving the second information OAMPDU, the CE device determines whether the configuration information of the CE device matches the configuration information of the PE device 1, and if the configuration information of the CE device matches the configuration information of the PE device 1, performs step 405.

The CE device may first determine, based on the matching result in the second information OAMPDU, whether the PE device 1 supports the function of the CE device, and if the PE device 1 supports the function of the CE device, may directly perform step 405, or if the PE device 1 does not support the function of the CE device, may determine, based on configuration information of the PE device 1 carried in the second information OAMPDU and configuration information of the CE device obtained from a local end, whether the CE device supports a function of the PE device 1. If the CE device supports the function of the PE device 1, step 405 may be performed.

Step 405: A negotiation process is already completed between the CE device and the PE device 1 in this case, the CE device stores, in a device information base, the device information of the PE device 1 carried in the second information OAMPDU, and stores, in port information of a port which is used to connect the CE device and the PE device 1, information indicating that the negotiation process is already completed between the CE device and the PE device 1, and the CE device enters a SEND_ANY state.

Step 406: The CE device sends a third information OAMPDU to the PE device 1. The third information OAMPDU includes the configuration information of the CE device and the configuration information of the PE device 1.

Step 407: After receiving the third information OAMPDU, the PE device 1 determines that the negotiation process is already completed between the PE device 1 and the CE device, and enters a SEND_ANY state.

After receiving the third information OAMPDU, the PE device 1 can determine that the negotiation process is already completed between the PE device 1 and the CE device, and therefore, may further store, in a device information base of the PE 1, device information of the CE device carried in the third information OAMPDU.

In this embodiment, the first information OAMPDU, the second information OAMPDU, and the third information OAMPDU are all negotiation packets.

Step 408: The PE device 1 sends a fourth information OAMPDU to the CE device, where the fourth information OAMPDU carries the device information of the PE device 1 and link fault information.

Step 409: The CE device receives the fourth information OAMPDU, determines, based on the port information of the port of the CE device receiving the fourth information OAMPDU, that is, the port information of the port which is used to connect the CE device and the PE device 1, that the negotiation process is already completed between the CE device and the PE device 1, and queries whether the device information base of the CE device includes the device information of the PE device 1 carried in the fourth information OAMPDU. If the device information base of the CE device includes the device information of the PE device 1 carried in the fourth information OAMPDU, it indicates that the PE device 1 or another device connected to the PE 1 is not attacked, and the fourth information OAMPDU is not a protocol packet constructed after the PE device 1 or the other device connected to the PE 1 is attacked. Therefore, step 410 is performed.

If the device information base of the CE device does not include the device information of the PE device 1 carried in the fourth information OAMPDU, it indicates that the fourth information OAMPDU is a protocol packet constructed after the PE device 1 or the other device connected to the PE 1 is attacked. In this case, the CE device may discard the fourth information OAMPDU.

Step 410: The CE device triggers a fault handling operation based on the link fault information in the fourth information OAMPDU, for example, sending alarm information to a network management system.

It should be noted that the CE device may be used as a network device in this embodiment of the present application. After receiving the fourth information OAMPDU, the CE device validates the fourth information OAMPDU. Alternatively, the PE device 1 may be used as a network device. When performing 407, the PE device 1 stores the device information of the CE device. After entering a SEND_ANY state, the PE device 1 validates the protocol packet sent by the CE device. A specific process is similar to a process in which the CE device validates the fourth information OAMPDU. Details are not described herein again.

Figure 6:
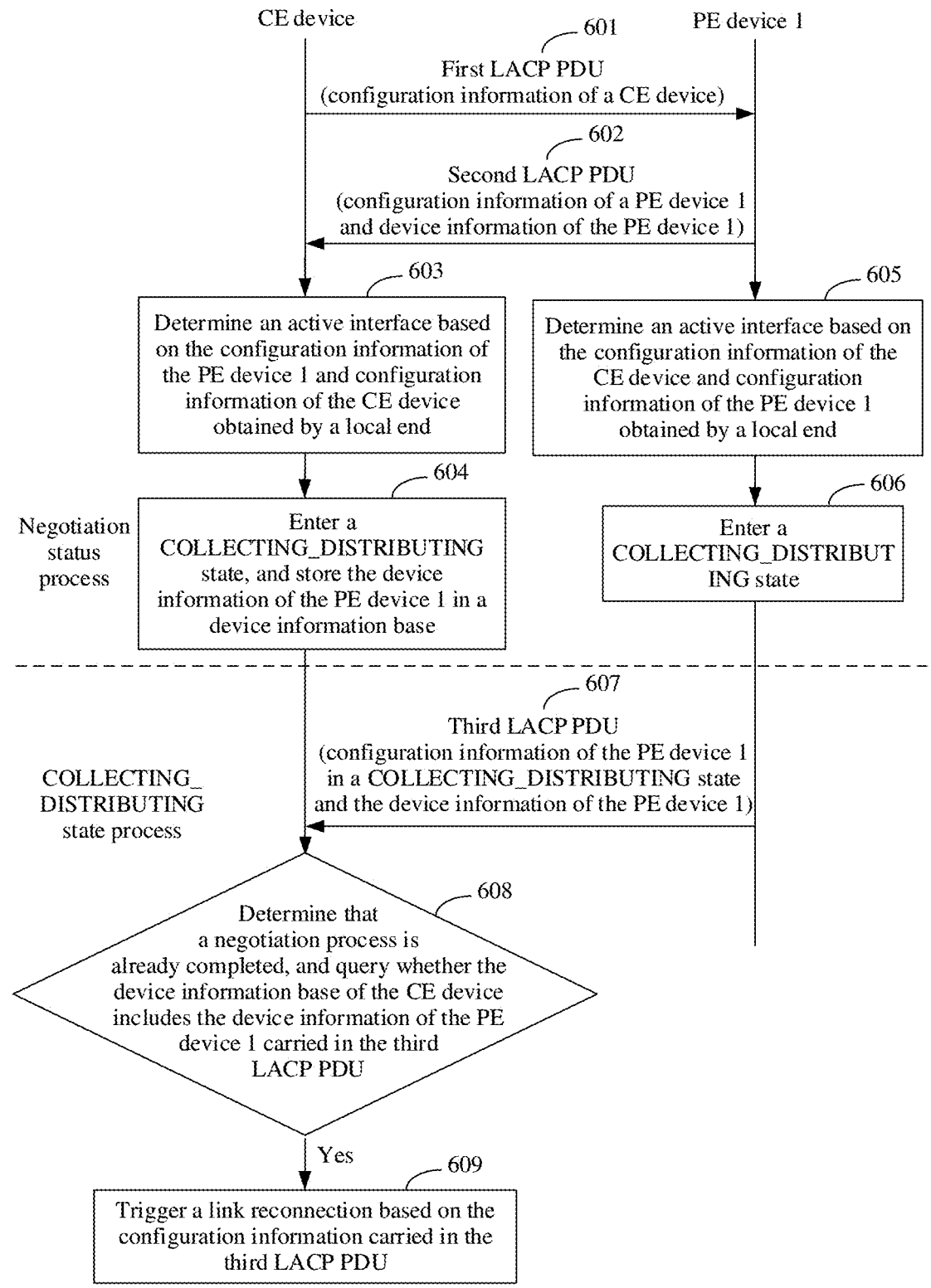
FIG. 6 is a schematic flowchart of another method embodiment according to an embodiment of the present application.

Referring to FIG. 6, an embodiment of the present application provides another method embodiment of a Slow Protocol packet processing method. A Slow Protocol in this embodiment is the LACP, and a Slow Protocol packet is an LACP PDU.

This embodiment may be applied to the application scenario shown in FIG. 5, and may be applied between a CE device and a PE device 1, or applied between a plurality of PE devices, for example, between the PE device 1 and a PE device 2. An example in which this embodiment is applied between the CE device and the PE device 1 is used below for description.

Step 601: The CE device sends a first LACP PDU to the PE device 1, where the first LACP PDU carries configuration information of the CE device.

The first LACP PDU may further carry device information of the CE device. The configuration information in this embodiment may be information indicated by an actor field and information indicated by a partner field. The device information in this embodiment may be information indicated by a source address field and information indicated by an actor_system field.

Step 602: The PE device 1 sends a second LACP PDU to the CE device, where the second LACP PDU carries configuration information of the PE device 1 and device information of the PE device 1.

An execution order of steps 601 and 602 is not limited. Steps 601 and 602 may be performed in order or simultaneously.

Step 603: After receiving the second LACP PDU, the CE device determines an active interface between the CE device and the PE device 1 based on the configuration information of the PE device 1 in the second LACP PDU and configuration information of the CE device obtained by a local end. Further, the CE device first determines an active end based on the configuration information of the PE device 1 and the configuration information of the CE device, and then determines the active interface between the CE device and the PE device 1 based on the active end. If the CE device can determine the active interface, and the active interface determined by the CE device is consistent with an active interface determined by the PE device 1, it indicates that the CE device successfully negotiates with the PE device 1, and step 604 is performed. If the CE device cannot determine the active interface, or the active interface determined by the CE device is inconsistent with an active interface determined by the PE device 1, it indicates that a negotiation process is not completed between the CE device and the PE device 1. In this case, the process may end or a negotiation is performed again.

Step 604: The CE device stores, in a device information base of the CE device, the device information of the PE device 1 carried in the second LACP PDU and stores, in port information of a port which is used to connect the CE device and the PE device 1, information indicating that the negotiation process is already completed between the CE device and the PE device 1, and the CE device enters a COLLECTING_DISTRIBUTING state.

Because a source address field and an actor_system field that are in an LACP PDU can be combined as a unique identifier of a device, information indicated by a source address field and an actor_system field that are in the second LACP PDU may be used as the device information of the PE device 1. It should be noted that no new information is added to the LACP PDU in this embodiment of the present application, but the PE device 1 is identified using information originally existing in the LACP PDU. It is additionally noted that information indicated by the source address field in the LACP PDU is used during forwarding, and information indicated by the actor_system field is used during a negotiation for the active interface.

Step 605: After receiving the first LACP PDU, the PE device 1 determines an active interface between the CE device and the PE device 1 based on the configuration information of the CE device in the first LACP PDU and the configuration information of the PE device 1 obtained by the local end. If the PE device 1 can determine the active interface, and the active interface determined by the PE device 1 is consistent with the active interface determined by the CE device, it indicates that the negotiation process is already completed between the CE device and the PE device 1, and step 606 is performed. If the PE device 1 cannot determine the active interface, or the active interface determined by the PE device 1 is inconsistent with the active interface determined by the CE device, it indicates that the negotiation process is not completed between the CE device and the PE device 1. In this case, the process may end or a negotiation is performed again.

Step 606: The PE device 1 enters a COLLECTING_DISTRIBUTING state.

In step 606, the PE device 1 may further store, in a device information base of the PE device 1, the device information of the CE device carried in the first LACP PDU.

In this embodiment, the first LACP PDU and the second LACP PDU are both negotiation packets.

Step 607: The PE device 1 sends a third LACP PDU to the CE device, where the third LACP PDU carries configuration information of the PE device 1 in a COLLECTING_DISTRIBUTING state and the device information of the PE device 1. The configuration information of the PE device 1 in a COLLECTING_DISTRIBUTING state is different from the configuration information of the PE device 1 in the negotiation process (that is, the configuration information of the PE device 1 carried in the second LACP PDU) through comparison. For example, information indicated by an actor field of the PE device 1 or information indicated by a partner field of the PE device 1 may be different.

Step 608: The CE device receives the third LACP PDU, determines, based on the port information of the port of the CE device receiving the third LACP PDU, that is, the port information of the port which is used to connect the CE device and the PE device 1, that the negotiation process is already completed between the CE device and the PE device 1, and queries whether the device information base of the CE device includes the device information of the PE device 1 carried in the third LACP PDU. If the device information base of the CE device includes the device information of the PE device 1 carried in the third LACP PDU, it indicates that the PE device 1 or another device connected to the PE 1 device is not attacked, and the third LACP PDU is not a protocol packet constructed after the PE device 1 or the other device connected to the PE 1 device is attacked. Therefore, step 609 is performed.

If the device information base of the CE device does not include the device information of the PE device 1 carried in the third LACP PDU, it indicates that the third LACP PDU is a protocol packet constructed after the PE device 1 or the other device connected to the PE 1 device is attacked. In this case, the CE device may discard the third LACP PDU.

Step 609: Trigger a link reconnection between the CE device and the PE device 1 based on the configuration information of the PE device 1 carried in the third LACP PDU, that is, redetermine the active interface between the CE device and the PE device 1.

It should be noted that the CE device may be used as a network device in this embodiment of the present application. After receiving the third LACP PDU, the CE device validates the third LACP PDU. Alternatively, the PE device 1 may be used as a network device. When performing 606, the PE device 1 stores the device information of the CE device. After entering a COLLECTING_DISTRIBUTING state, the PE device 1 validates the LACP PDU sent by the CE device. A specific process is similar to a process in which the CE device validates the third LACP PDU. Details are not described herein again.

The Slow Protocol in this embodiment may be a marker protocol, and the Slow Protocol packet is a marker PDU. A specific implementation process is similar to the LACP-based implementation process in this embodiment. Details are not described herein again.

The method embodiments of the Slow Protocol packet processing method in the embodiments of the present application are described above, and a network device in an embodiment of the present application is described below from a perspective of a modular functional entity.

Figure 7:
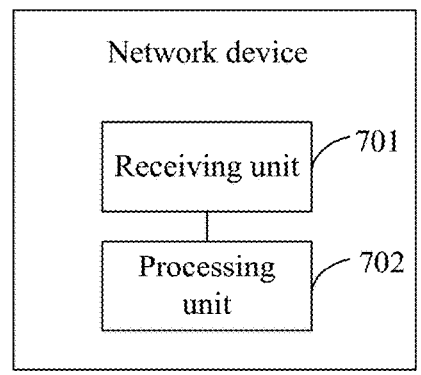
FIG. 7 is a schematic structural diagram of an apparatus embodiment according to an embodiment of the present application.

Referring to FIG. 7, an embodiment of the present application provides an apparatus embodiment of a network device. The network device in this embodiment includes a receiving unit 701 and a processing unit 702.

In this embodiment, a destination MAC address of a Slow Protocol packet uses a Slow_Protocols_Multicast address, a value of the Slow_Protocols_Multicast address is 01-80-c2-00-00-02, and a value of a type field of the Slow Protocol packet is 8809. A Slow Protocol may be the LACP, a marker protocol, or an OAM protocol. When the Slow Protocol is the OAM protocol, the Slow Protocol packet is an information OAMPDU. When the Slow Protocol is the LACP, the Slow Protocol packet is an LACP PDU. When the Slow Protocol is the marker protocol, the Slow Protocol packet is a marker PDU.

In this embodiment, the network device stores a device information base, and the device information base includes device information stored by the network device in a negotiation process.

The receiving unit 701 is configured to receive a first Slow Protocol packet. The first Slow Protocol packet carries device information of a transmit end device of the first Slow Protocol packet.

The device information of the transmit end device of the first Slow Protocol packet may be device identification information of the transmit end device of the first Slow Protocol packet, and is used to uniquely identify the transmit end device of the first Slow Protocol packet. When the first Slow Protocol packet is an information OAMPDU, the device information of the transmit end device of the first Slow Protocol packet may include one or more pieces of information indicated by a source address field or information indicated by an OUI field of the first Slow Protocol packet. When the first Slow Protocol packet is a marker PDU or an LACP PDU, the device information of the transmit end device of the first Slow Protocol packet may include one or more pieces of information indicated by a source address field or information indicated by an actor_system field of the first Slow Protocol packet.

In this embodiment, the network device may be connected to the transmit end device of the first Slow Protocol packet directly using a communications link or using a transparent transmission device.

The processing unit 702 is configured to determine, based on port information of a port of the receiving unit 701 in the network device receiving the first Slow Protocol packet, that a negotiation process is already completed between the network device and the transmit end device, and query, based on the device information of the transmit end device carried in the first Slow Protocol packet, whether a device information base stored by the network device in the negotiation process includes the device information of the transmit end device.

The device information base includes device information received by the network device in the negotiation process. Further, in this embodiment of the present application, the network device receives a second Slow Protocol packet in the negotiation process, and stores, in the device information base, device information of a transmit end device of the second Slow Protocol packet carried in the second Slow Protocol packet.

After the negotiation process is completed between the network device and the transmit end device, the network device and the transmit end device separately enter a working process. The working process is a steady-state process entered after the negotiation process. When the first Slow Protocol packet is the information OAMPDU, the working process may be a process of being in a SEND_ANY state. When the first Slow Protocol packet is the marker PDU or the LACP PDU, the working process may be a process of being in a COLLECTING_DISTRIBUTING state.

The processing unit 702 is further configured to identify the first Slow Protocol packet as a valid packet in response to a result that the device information base includes the device information of the transmit end device.

After the first Slow Protocol packet is identified as the valid packet, a corresponding operation may be further triggered based on the first Slow Protocol packet, and is separately described below.

Optionally, the first Slow Protocol packet further carries link information, and the link information is used to indicate a link status of a link between the network device and the transmit end device, and the processing unit 702 is further configured to trigger a first operation based on the link information after identifying the first Slow Protocol packet as a valid packet in response to a result that the device information base includes the device information of the transmit end device, where the first operation includes at least one of the following operations, a link reconnection operation or a fault handling operation.

Optionally, the first Slow Protocol packet further carries configuration information of the transmit end device in a working process, and the configuration information of the transmit end device in the working process is different from configuration information of the transmit end device in the negotiation process, and the processing unit 702 is further configured to trigger a second operation based on the configuration information of the transmit end device in the working process after identifying the first Slow Protocol packet as a valid packet in response to a result that the device information base includes the device information of the transmit end device, where the second operation includes a link reconnection operation.

Optionally, the processing unit 702 is further configured to identify the first Slow Protocol packet as an invalid packet in response to a result that the device information base does not include the device information of the transmit end device.

Optionally, the processing unit 702 is further configured to discard the first Slow Protocol packet after identifying the first Slow Protocol packet as an invalid packet in response to a result that the device information base does not include the device information of the transmit end device.

Optionally, the processing unit 702 is further configured to trigger an alarm operation when a quantity of invalid packets received by the receiving unit from the transmit end device in a preset period is greater than or equal to a preset threshold.

In this embodiment of the present application, the network device stores the device information in the device information base. A storage process is described below.

Optionally, the receiving unit 701 is further configured to receive a second Slow Protocol packet before receiving the first Slow Protocol packet, where the second Slow Protocol packet carries device information of a transmit end device of the second Slow Protocol packet, and the second Slow Protocol packet is a negotiation packet, and the processing unit 702 is further configured to determine that a negotiation process is already completed between the network device and the transmit end device of the second Slow Protocol packet, and store, in the device information base, the device information of the transmit end device carried in the second Slow Protocol packet.

A plurality of manners may be used by the processing unit 702 to determine that the negotiation process is already completed between the network device and the transmit end device of the second Slow Protocol packet, and are described below in detail.

Optionally, the network device works in an active mode, and when the processing unit 702 is configured to determine that the negotiation process is already completed between the network device and the transmit end device of the second Slow Protocol packet, the processing unit 702 is further configured to obtain a result of matching between configuration information of the network device and configuration information of the transmit end device of the second Slow Protocol packet, and determine, based on the matching result, that the configuration information of the network device matches the configuration information of the transmit end device of the second Slow Protocol packet.

Optionally, the network device works in a passive mode, and when the processing unit 702 is configured to determine that the negotiation process is already completed between the network device and the transmit end device of the second Slow Protocol packet, the processing unit 702 is further configured to determine that the receiving unit 701 receives a third Slow Protocol packet sent by the transmit end device of the second Slow Protocol packet, where the third Slow Protocol packet carries configuration information of the network device and configuration information of the transmit end device of the second Slow Protocol packet.

Optionally, the second Slow Protocol packet further carries configuration information of the transmit end device of the second Slow Protocol packet, and when the processing unit 702 is configured to determine that the negotiation process is already completed between the network device and the transmit end device of the second Slow Protocol packet, the processing unit 702 is further configured to determine an active interface between the network device and the transmit end device of the second Slow Protocol packet based on configuration information of the network device and the configuration information of the transmit end device carried in the second Slow Protocol packet, and determine, based on an active interface determined by the transmit end device of the second Slow Protocol packet, that the active interface determined by the network device is consistent with the active interface determined by the transmit end device of the second Slow Protocol packet.

The network device in this embodiment of the present application is described above from the perspective of the modular functional entity. A network device in an embodiment of the present application is described below from a hardware processing perspective.

Figure 8:
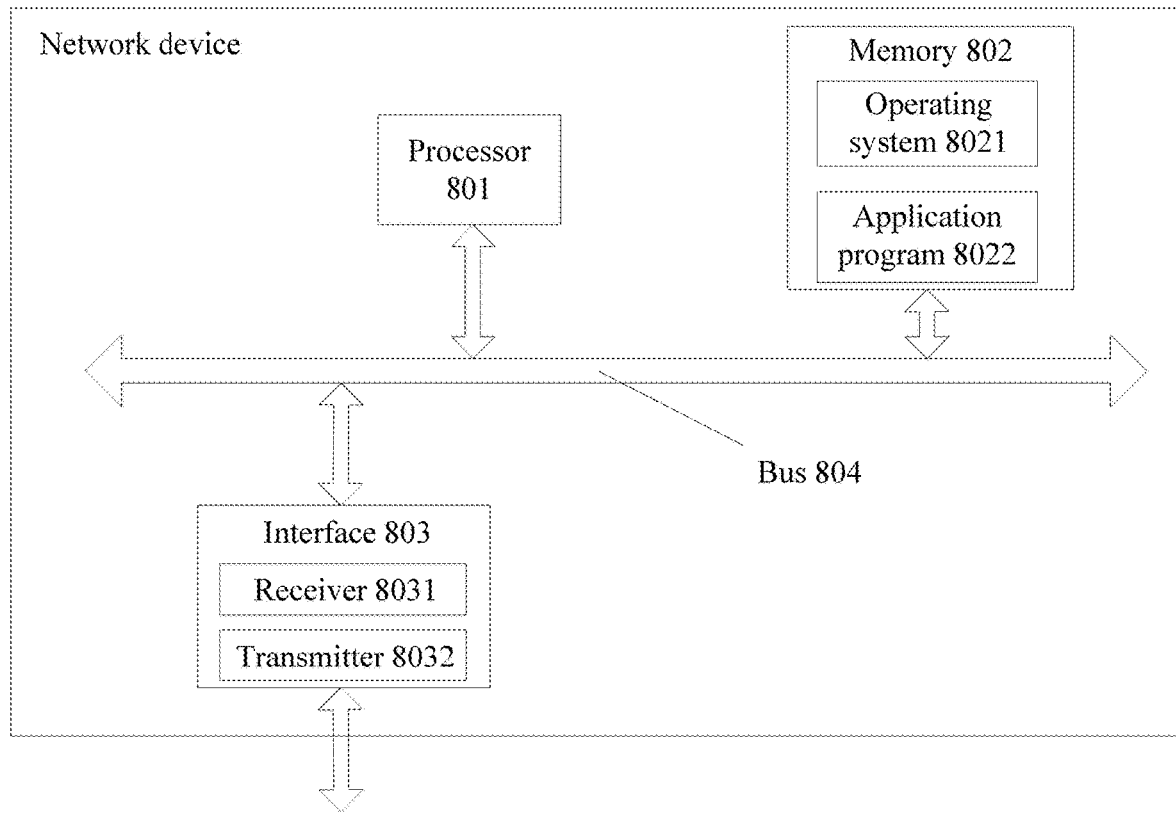
FIG. 8 is a schematic structural diagram of another apparatus embodiment according to an embodiment of the present application.

Referring to FIG. 8, an embodiment of the present application provides an apparatus embodiment of a network device. The network device in this embodiment includes a processor 801, a memory 802, an interface 803, and a bus 804. The interface 803 may be implemented wirelessly or in a wired manner, and may be an element, such as a network adapter. The processor 801, the memory 802, and the interface 803 are connected using the bus 804. The interface 803 further includes a receiver 8031 and a transmitter 8032.

The processor 801 may be a central processing unit (CPU), or an application-specific integrated circuit (ASIC), or one or more integrated circuits configured to implement this embodiment of this application.

In this embodiment, a destination MAC address of a Slow Protocol packet uses a Slow_Protocols_Multicast address, a value of the Slow_Protocols_Multicast address is 01-80-c2-00-00-02, and a value of a type field of the Slow Protocol packet is 8809. A Slow Protocol may be the LACP, a marker protocol, or an OAM protocol. When the Slow Protocol is the OAM protocol, the Slow Protocol packet is an information OAMPDU. When the Slow Protocol is the LACP, the Slow Protocol packet is an LACP PDU. When the Slow Protocol is the marker protocol, the Slow Protocol packet is a marker PDU.

In this embodiment, the memory 802 includes an operating system 8021 and an application program 8022, and is configured to store a program, code, or an instruction. When executing the program, the code, or the instruction, the processor or a hardware device may complete the processing processes of the network device that are in FIG. 1 to FIG. 4A and FIG. 4B and FIG. 6. The memory 802 further stores a device information base, and the device information base includes device information stored by the network device in a negotiation process. The memory 802 may include a high-speed random access memory RAM), or may include a non-volatile memory, such as at least one magnetic disk storage.

The receiver 8031 is configured to receive a first Slow Protocol packet. The first Slow Protocol packet carries device information of a transmit end device of the first Slow Protocol packet.

The device information of the transmit end device of the first Slow Protocol packet may be device identification information of the transmit end device of the first Slow Protocol packet, and is used to uniquely identify the transmit end device of the first Slow Protocol packet. When the first Slow Protocol packet is an information OAMPDU, the device information of the transmit end device of the first Slow Protocol packet may include one or more pieces of information indicated by a source address field or information indicated by an OUI field of the first Slow Protocol packet. When the first Slow Protocol packet is a marker PDU or an LACP PDU, the device information of the transmit end device of the first Slow Protocol packet may include one or more pieces of information indicated by a source address field or information indicated by an actor_system field of the first Slow Protocol packet.

In this embodiment, the network device may be connected to the transmit end device of the first Slow Protocol packet directly using a communications link or using a transparent transmission device.

Similarly, the network device may further send a Slow Protocol packet to the transmit end device using the transmitter 8032 such that the transmit end device validates the Slow Protocol packet.

The processor 801 is configured to determine, based on port information of a port of the network device receiving the first Slow Protocol packet, that a negotiation process is already completed between the network device and the transmit end device, query, based on the device information of the transmit end device carried in the first Slow Protocol packet, whether a device information base stored by the network device in the negotiation process includes the device information of the transmit end device, and identify the first Slow Protocol packet as a valid packet in response to a result that the device information base includes the device information of the transmit end device.

Optionally, the first Slow Protocol packet further carries link information, and the link information is used to indicate a link status of a link between the network device and the transmit end device, and the processor 801 is further configured to trigger a first operation based on the link information after identifying the first Slow Protocol packet as a valid packet in response to a result that the device information base includes the device information of the transmit end device. The first operation includes at least one of the following operations a link reconnection operation or a fault handling operation.

Optionally, the first Slow Protocol packet further carries configuration information of the transmit end device in a working process, and the configuration information of the transmit end device in the working process is different from configuration information of the transmit end device in the negotiation process, and the processor 801 is further configured to trigger a second operation based on the configuration information of the transmit end device in the working process after identifying the first Slow Protocol packet as a valid packet in response to a result that the device information base includes the device information of the transmit end device, where the second operation includes a link reconnection operation.

Optionally, the processor 801 is further configured to identify the first Slow Protocol packet as an invalid packet in response to a result that the device information base does not include the device information of the transmit end device.

Optionally, the processor 801 is further configured to discard the first Slow Protocol packet after identifying the first Slow Protocol packet as an invalid packet in response to a result that the device information base does not include the device information of the transmit end device.

Optionally, the processor 801 is further configured to trigger an alarm operation when a quantity of invalid packets received by the receiver from the transmit end device in a preset period is greater than or equal to a preset threshold.

Optionally, the receiver 8031 is further configured to receive a second Slow Protocol packet before receiving the first Slow Protocol packet, where the second Slow Protocol packet carries device information of a transmit end device of the second Slow Protocol packet, and the second Slow Protocol packet is a negotiation packet, and the processor 801 is further configured to determine that a negotiation process is already completed between the network device and the transmit end device of the second Slow Protocol packet, and store, in the device information base, the device information of the transmit end device carried in the second Slow Protocol packet.

Optionally, the network device works in an active mode, and when the processor 801 is configured to determine that the negotiation process is already completed between the network device and the transmit end device of the second Slow Protocol packet, the processor 801 is further configured to obtain a result of matching between configuration information of the network device and configuration information of the transmit end device of the second Slow Protocol packet, and determine, based on the matching result, that the configuration information of the network device matches the configuration information of the transmit end device of the second Slow Protocol packet.

Optionally, the network device works in a passive mode, and when the processor 801 is configured to determine that the negotiation process is already completed between the network device and the transmit end device of the second Slow Protocol packet, the processor 801 is further configured to determine that the receiver receives a third Slow Protocol packet sent by the transmit end device of the second Slow Protocol packet, where the third Slow Protocol packet carries configuration information of the network device and configuration information of the transmit end device of the second Slow Protocol packet.

Optionally, the second Slow Protocol packet further carries configuration information of the transmit end device of the second Slow Protocol packet, and when the processor 801 is configured to determine that the negotiation process is already completed between the network device and the transmit end device of the second Slow Protocol packet, the processor 801 is further configured to determine an active interface between the network device and the transmit end device of the second Slow Protocol packet based on configuration information of the network device and the configuration information of the transmit end device carried in the second Slow Protocol packet, and determine, based on an active interface determined by the transmit end device of the second Slow Protocol packet, that the active interface determined by the network device is consistent with the active interface determined by the transmit end device of the second Slow Protocol packet.

Each hardware component of the network device provided in this embodiment may be a specific implementation based on the method embodiment shown in FIG. 3 and functions of the apparatus embodiment shown in FIG. 7. A definition and a description of a term herein are consistent with those in the method embodiment shown in FIG. 3 and the apparatus embodiment shown in FIG. 7. Details are not described herein again.

In addition, an embodiment of this application provides a computer storage medium configured to store a computer software instruction used by the foregoing network device. The computer storage medium includes a designed program configured to perform the embodiments shown in FIG. 1 to FIG. 4A and FIG. 4B and FIG. 6.

The term "first," "second," "third," "fourth," or the like in the specification, the claims, and the foregoing accompanying drawings of the present application is used to distinguish similar objects, and is unnecessarily used to describe a specific order. It should be understood that the data termed in such a way is interchangeable in proper circumstances so that the embodiments of the present application described herein can be implemented in other orders than the order illustrated or described herein. Moreover, the terms "include," "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the other approaches, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present application. The foregoing storage medium includes any medium that can store program code, such as a universal serial bus (USB) flash drive, a removable hard disk, a read-only memory (ROM), a RAM, a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A Slow Protocol packet processing method, comprising:
   receiving, by a network device, a second Slow Protocol packet, wherein the second Slow Protocol packet carries device information of a transmit end device of the second Slow Protocol packet, and wherein the second Slow Protocol packet is a negotiation packet;
   determining, by the network device, that a negotiation process is already completed between the network device and the transmit end device of the second Slow Protocol packet;
   storing, by the network device in a device information base, the device information of the transmit end device carried in the second Slow Protocol packet;
   receiving, by the network device, a first Slow Protocol packet, wherein the first Slow Protocol packet is received after the second Slow Protocol packet, and wherein the first Slow Protocol packet carries device information of a transmit end device of the first Slow Protocol packet;
   determining, by the network device based on port information of a port of the network device receiving the first Slow Protocol packet, that a negotiation process is already completed between the network device and the transmit end device of the first Slow Protocol packet;
   querying, by the network device based on the device information of the transmit end device carried in the first Slow Protocol packet, whether the device information base stored by the network device in the negotiation process comprises the device information of the transmit end device of the first Slow Protocol packet; and
   identifying, by the network device, the first Slow Protocol packet as a valid packet in response to a result that the device information base comprises the device information of the transmit end device of the first Slow Protocol packet.

2. The Slow Protocol packet processing method of claim 1, wherein the first Slow Protocol packet further carries link information, wherein the link information indicates a link status of a link between the network device and the transmit end device of the first Slow Protocol packet, wherein after identifying the first Slow Protocol packet as the valid packet, the Slow Protocol packet processing method further comprises triggering, by the network device, a first operation based on the link information, and wherein the first operation comprises at least one of a link reconnection operation or a fault handling operation.

3. The Slow Protocol packet processing method of claim 1, wherein the first Slow Protocol packet further carries configuration information of the transmit end device of the first Slow Protocol packet in a working process, wherein the configuration information of the transmit end device of the first Slow Protocol packet in the working process is different from configuration information of the transmit end device of the first Slow Protocol packet in the negotiation process, wherein after identifying the first Slow Protocol packet as the valid packet, the Slow Protocol packet processing method further comprises triggering, by the network device, a second operation based on the configuration information of the transmit end device of the first Slow Protocol packet in the working process, and wherein the second operation comprises a link reconnection operation.

4. The Slow Protocol packet processing method of claim 1, further comprising identifying, by the network device, the first Slow Protocol packet as an invalid packet in response to a result that the device information base does not comprise the device information of the transmit end device of the first Slow Protocol packet.

5. The Slow Protocol packet processing method of claim 4, wherein after identifying the first Slow Protocol packet as the invalid packet, the Slow Protocol packet processing method further comprises discarding, by the network device, the first Slow Protocol packet.

6. The Slow Protocol packet processing method of claim 4, wherein a quantity of invalid packets received by the network device from the transmit end device of the first Slow Protocol packet in a preset period is greater than or equal to a preset threshold, and wherein the Slow Protocol packet processing method further comprises triggering, by the network device, an alarm operation.

7. The Slow Protocol packet processing method of claim 1, wherein the network device works in an active mode, and wherein determining that the negotiation process is already completed between the network device and the transmit end device of the second Slow Protocol packet comprises:
   obtaining, by the network device, a matching result between configuration information of the network device and configuration information of the transmit end device of the second Slow Protocol packet; and
   determining, by the network device based on the matching result, that the configuration information of the network device matches the configuration information of the transmit end device of the second Slow Protocol packet.

8. The Slow Protocol packet processing method of claim 1, wherein the network device works in a passive mode, wherein determining that the negotiation process is already completed between the network device and the transmit end device of the second Slow Protocol packet comprises receiving, by the network device, a third Slow Protocol packet from the transmit end device of the second Slow Protocol packet, and wherein the third Slow Protocol packet carries configuration information of the network device and configuration information of the transmit end device of the second Slow Protocol packet.

9. The Slow Protocol packet processing method of claim 1, wherein the second Slow Protocol packet further carries configuration information of the transmit end device of the second Slow Protocol packet, and wherein determining that the negotiation process is already completed between the network device and the transmit end device of the second Slow Protocol packet comprises:
   determining, by the network device, an active interface between the network device and the transmit end device of the second Slow Protocol packet based on configuration information of the network device and the configuration information of the transmit end device of the second Slow Protocol packet; and
   determining, by the network device based on an active interface received from the transmit end device of the second Slow Protocol packet, that the active interface determined by the network device is consistent with the active interface received from the transmit end device of the second Slow Protocol packet.

10. The Slow Protocol packet processing method of claim 1, wherein the network device is coupled to the transmit end device of the first Slow Protocol packet directly or using a transparent transmission device.

11. The Slow Protocol packet processing method of claim 1, wherein a value of a destination Media Access Control (MAC) address of the first Slow Protocol packet is 01-80-c2-00-00-02, and wherein a value of a type field of the first Slow Protocol packet is 8809.

12. The Slow Protocol packet processing method of claim 1, wherein in a first manner, the first Slow Protocol packet is an operation, administration and maintenance (OAM) protocol packet, and wherein the device information of the transmit end device of the first Slow Protocol packet comprises:
one or more pieces of information indicated by a source address field; or
information indicated by an organizationally unique identifier (OUI) field of the first Slow Protocol packet, or
wherein in a second specific manner, the first Slow Protocol packet is a marker protocol packet or a Link Aggregation Control Protocol (LACP) packet, and wherein the device information of the transmit end device of the first Slow Protocol packet comprises:
the one or more pieces of the information indicated by the source address field; or
information indicated by an actor_system field of the first Slow Protocol packet.

13. A network device, comprising:
a non-transitory memory storing instructions; and
a processor coupled to the non-transitory memory, wherein the instructions, when executed by the processor, cause the network device to be configured to:
receive a second Slow Protocol packet before receiving a first Slow Protocol packet, wherein the second Slow Protocol packet carries device information of a transmit end device of the second Slow Protocol packet, and wherein the second Slow Protocol packet is a negotiation packet;
determine that a negotiation process is already completed between the network device and the transmit end device of the second Slow Protocol packet;
store, in a device information base, the device information of the transmit end device of the second Slow Protocol packet;
receive the first Slow Protocol packet, wherein the first Slow Protocol packet carries device information of a transmit end device of the first Slow Protocol packet;
determine, based on port information of a port of the network device receiving the first Slow Protocol packet, that a negotiation process is already completed between the network device and the transmit end device of the first Slow Protocol packet;
query, based on the device information of the transmit end device carried in the first Slow Protocol packet, whether the device information base stored by the network device in the negotiation process comprises the device information of the transmit end device of the first Slow Protocol packet; and
identify the first Slow Protocol packet as a valid packet in response to a result that the device information base comprises the device information of the transmit end device of the first Slow Protocol packet.

14. The network device of claim 13, wherein the first Slow Protocol packet further carries link information, wherein the link information indicates a link status of a link between the network device and the transmit end device of the first Slow Protocol packet, wherein the instructions, when executed by the processor, further cause the network device to be configured to trigger a first operation based on the link information after identifying the first Slow Protocol packet as the valid packet, and wherein the first operation comprises at least one of a link reconnection operation or a fault handling operation.

15. The network device of claim 13, Wherein the first Slow Protocol packet further carries configuration information of the transmit end device of the first Slow Protocol packet in a working process, wherein the configuration information of the transmit end device of the first Slow Protocol packet in the working process is different from configuration information of the transmit end device of the first Slow Protocol packet in the negotiation process, wherein the instructions, when executed by the processor, further cause the network device to be configured to trigger a second operation based on the configuration information of the transmit end device of the first Slow Protocol packet in the working process after identifying the first Slow Protocol packet as the valid packet, and wherein the second operation comprises a link reconnection operation.

16. The network device of claim 13, wherein the instructions, when executed by the processor, further cause the network device to be configured to identify the first Slow Protocol packet as an invalid packet in response to a result that the device information base does not comprise the device information of the transmit end device of the first Slow Protocol packet.

17. The network device of claim 16, wherein the instructions, when executed by the processor, further cause the network device to be configured to discard the first Slow Protocol packet after identifying the first Slow Protocol packet as the invalid packet.

18. The network device of claim 16, wherein a quantity of invalid packets received by the network device from the transmit end device of the first Slow Protocol packet in a preset period is greater than or equal to a preset threshold, and wherein the instructions, when executed by the processor, further cause the network device to be configured to trigger an alarm operation.

19. The network device of claim 13, wherein the network device works in an active mode, and wherein the instructions, when executed by the processor, further cause the network device to be configured to;
obtain a matching result between configuration information of the network device and configuration information of the transmit end device of the second Slow Protocol packet when the negotiation process is already completed between the network device and the transmit end device of the second Slow Protocol packet; and
determine, based on the matching result, that the configuration information of the network device matches the configuration information of the transmit end device of the second Slow Protocol packet.

20. The network device of claim 13, wherein the network device works in a passive mode, wherein the instructions, when executed by the processor, further cause the network device to be configured to determine that the network device receives a third Slow Protocol packet from the transmit end device of the second Slow Protocol packet when the negotiation process is already completed between the network device and the transmit end device of the second Slow Protocol packet, and wherein the third Slow Protocol packet carries configuration information of the network device and configuration information of the transmit end device of the second Slow Protocol packet.

21. The network device of claim 13, wherein the second Slow Protocol packet further carries configuration information of the transmit end device of the second Slow Protocol packet, and wherein the instructions, when executed by the processor, further cause the network device to be configured to:

determine an active interface between the network device and the transmit end device of the second Slow Protocol packet based on configuration information of the network device and the configuration information of the transmit end device of the second Slow Protocol packet when the negotiation process is already completed between the network device and the transmit end device of the second Slow Protocol packet; and determine, based on an active interface received from the transmit end device of the second Slow Protocol packet, that the active interface determined by the network device is consistent with the active interface received from the transmit end device of the second Slow Protocol packet.

22. The network device of claim 13, wherein the network device is coupled to the transmit end device of the first Slow Protocol packet directly or using a transparent transmission device.

23. The network device of claim 13, wherein a value of a destination Media Access Control (MAC) address of the first Slow Protocol packet is 01-80-c2-00-00-02, and wherein a value of a type field of the first Slow Protocol packet is 8809.

24. The network device of claim 13, wherein in a first manner, the first Slow Protocol packet is an operation, administration and maintenance (OAM) protocol packet, and wherein the device information of the transmit end device of the first Slow Protocol packet comprises:

one or more pieces of information indicated by a source address field; or information indicated by an organizationally unique identifier (OUI) field of the first Slow Protocol packet, or wherein in a second manner, the first Slow Protocol packet is a marker protocol packet or a Link Aggregation Control Protocol (LACP) packet, and whereon the device information of the transmit end device of the first Slow Protocol packet comprises:

the one or more pieces of the information indicated by the source address field; or information indicated by an actor_system field of the first Slow Protocol packet.

* * * * *